US012796672B2

(12) United States Patent
Tugel

(10) Patent No.: US 12,796,672 B2
(45) Date of Patent: Nov. 17, 2026

(54) BUG-REMOVAL VACUUM MACHINE

(71) Applicant: Buck Tugel, King City, CA (US)

(72) Inventor: Buck Tugel, King City, CA (US)

( * ) Notice: Subject to any disclaimer, the term of this patent is extended or adjusted under 35 U.S.C. 154(b) by 0 days.

(21) Appl. No.: 19/175,413

(22) Filed: Apr. 10, 2025

(65) Prior Publication Data

US 2025/0234852 A1 Jul. 24, 2025

Related U.S. Application Data

(60) Continuation-in-part of application No. 18/773,349, filed on Jul. 15, 2024, which is a division of application No. 18/532,823, filed on Dec. 7, 2023, now Pat. No. 12,089,587.

(51) Int. Cl.

| | |
|---|---|
| ***A01M 5/08*** | (2006.01) |
| ***A01M 1/22*** | (2006.01) |
| ***A01M 29/18*** | (2011.01) |

(52) U.S. Cl.
CPC ................ *A01M 5/08* (2013.01); *A01M 1/22* (2013.01); *A01M 29/18* (2013.01)

(58) Field of Classification Search
CPC A01M 5/00; A01M 5/02; A01M 5/04; A01M 5/08; A01M 1/06; A01M 29/18; A01M 29/16; A01M 1/22
USPC ................. 43/139–143, 133, 132.1; 367/139
See application file for complete search history.

(56) References Cited

U.S. PATENT DOCUMENTS 620,362 A * 2/1899 Richardson ............. A01M 5/04 43/128
685,112 A * 10/1901 Dannelly ................ A01M 5/08 43/140
733,020 A * 7/1903 Ferriott ................... A01M 5/08 43/140
752,790 A * 2/1904 Miller ..................... A01M 5/08 43/140
763,953 A * 7/1904 Bolen ..................... A01M 5/08 43/140

(Continued)

FOREIGN PATENT DOCUMENTS

CN 110366886 A * 10/2019 ............. A01B 49/04
CN 112088869 A * 12/2020 ............. B64U 10/10

(Continued)

*Primary Examiner* — Darren W Ark
(74) *Attorney, Agent, or Firm* — Donald R. Boys; Central Coast Patent Agengy LLC

(57) ABSTRACT

A vacuum machine has a deck, an interface to attach to a tractor, sidewalls from the deck, an opening for pulling in air and insects, a first plenum having a lower periphery enclosing the opening through the deck and a height, a fan assembly having a fan housing with a lower periphery joined to the upper circumferential edge of the first plenum, the fan assembly having a first fan driven by a motor, fan adapted to draw air upward, through the first plenum, perforated panels in the second plenum for killing insects, one or more ultrasonic transmitters positioned in a structural element on a forward portion of the vacuum machine, oriented to transmit in a direction of the vacuum machine; and power circuitry coupled to the one or more ultrasonic transmitters providing electrical power producing an ultrasonic wave projecting forward in the direction of travel of the vacuum machine.

2 Claims, 23 Drawing Sheets

(56) References Cited

U.S. PATENT DOCUMENTS 777,088 A * 12/1904 Franklin et al. ...... A01M 1/106 43/139
862,743 A * 8/1907 Larson .................... A01M 5/08 43/140
886,535 A * 5/1908 Mccurdy et al. ....... A01M 5/08 43/140
986,193 A * 3/1911 Meek ...................... A01M 5/08 43/140
996,337 A * 6/1911 Hill ........................ A01M 5/08 43/140
1,012,437 A * 12/1911 Olden ..................... A01M 5/08 43/141
1,016,861 A * 2/1912 Wheeler ................. A01M 5/08 43/140
1,024,698 A * 4/1912 Pinson .................... A01M 5/08 43/140
1,046,206 A * 12/1912 Lucas ..................... A01M 5/08 43/140
1,144,019 A * 6/1915 Bacon ..................... A01M 5/08 43/140
1,146,687 A * 7/1915 Britton et al. .......... A01M 5/08 43/140
1,180,977 A * 4/1916 Cook ...................... A01M 5/08 406/171
1,189,720 A * 7/1916 Morrow .................. A01M 5/08 43/140
1,223,415 A * 4/1917 Nolin ...................... A01M 5/08 43/140
1,228,313 A * 5/1917 Goar ....................... A01M 5/08 43/140
1,239,103 A * 9/1917 Haynes ................... A01M 5/08 43/140
1,243,302 A * 10/1917 Jones et al. ............. A01M 5/08 43/140
1,244,834 A * 10/1917 Clement ................. A01M 5/08 43/140
1,245,258 A * 11/1917 Miller ..................... A01M 5/08 43/140
1,250,516 A * 12/1917 Salter ...................... A01M 5/08 43/140
1,263,312 A * 4/1918 Diserens et al. ........ A01M 5/08 43/143
1,292,871 A * 1/1919 Pierce ..................... A01M 5/08 43/140
1,309,556 A * 7/1919 Van Riper ............... A01M 5/08 43/140
1,325,475 A * 12/1919 Kemp ..................... A01M 5/04 43/138
1,400,459 A * 12/1921 Roe ......................... A01M 5/08 43/140
1,405,573 A * 2/1922 Elliott ..................... A01M 5/04 43/140
1,426,234 A * 8/1922 Weiss ...................... A01M 5/04 43/140
1,431,108 A * 10/1922 Fenley .................... A01M 5/04 43/140
1,452,918 A * 4/1923 La Croix ................ A01M 5/08 43/140
1,457,420 A * 6/1923 Bender ................... A01M 5/04 43/142
1,476,259 A * 12/1923 Lantz ...................... A01M 5/04 43/140
1,480,498 A * 1/1924 Broadwell .............. A01M 5/08 43/140
1,483,795 A * 2/1924 Gibson ................... A01M 5/04 43/140
1,485,726 A * 3/1924 Setser ..................... A01M 5/08 43/140
1,489,214 A * 4/1924 Hickman ................ A01M 5/04 43/140
1,490,035 A * 4/1924 Shell ....................... A01M 5/08 43/140
1,495,098 A * 5/1924 Nelson .................... A01M 5/08 43/138
1,496,395 A * 6/1924 Vandiveer ............... A01M 5/08 43/140
1,515,826 A * 11/1924 Bohn ...................... A01M 5/04 43/140
1,521,424 A * 12/1924 Brownlow ............. A01M 5/04 43/140
1,532,215 A * 4/1925 Woods .................... A01M 5/04 43/142
1,537,893 A * 5/1925 Smith ..................... A01M 5/04 43/140
1,547,049 A * 7/1925 Kramer ................... A01M 5/04 43/140
1,554,934 A * 9/1925 White ..................... A01M 5/04 43/140
1,560,529 A * 11/1925 Betts, Jr. ................ A01M 5/04 43/140
1,561,536 A * 11/1925 Hamlet ................... A01M 5/04 43/140
1,563,668 A * 12/1925 Smith ..................... A01M 5/04 43/138
1,569,196 A * 1/1926 Mcdaniel ............... A01M 5/04 43/140
1,573,997 A * 2/1926 Reed ....................... A01M 5/08 43/140
1,578,423 A * 3/1926 Gibson ................... A01M 5/04 43/140
1,582,744 A * 4/1926 Fratzke ................... A01M 5/08 43/140
1,586,123 A * 5/1926 Sikorski ................. A01M 5/04 43/140
1,630,016 A * 5/1927 Kisselburg ............. A01M 5/04 422/305
1,637,477 A * 8/1927 Delgado ................. A01M 5/04 43/140
1,654,783 A * 1/1928 Blanks .................... A01M 5/08 43/140
1,724,797 A * 8/1929 Gibson ................... A01M 5/04 43/142
1,822,277 A * 9/1931 Dupont ................... A01M 5/08 43/140
1,849,180 A * 3/1932 Driver ..................... A01M 1/06 43/140
1,849,425 A * 3/1932 Guerra .................... A01M 5/04 43/140
1,989,405 A * 1/1935 Dillman .................. A01M 5/08 56/34
2,111,030 A * 3/1938 Mote ....................... A01M 5/08 56/16.8
2,179,766 A * 11/1939 Webb ...................... A01M 5/08 43/140
2,188,094 A * 1/1940 Grabe ..................... A01M 5/08 43/140
2,201,463 A * 5/1940 Williams ................ A01M 5/08 43/140
2,346,270 A * 4/1944 Nisbet ..................... A01M 5/08 15/346
2,374,150 A * 4/1945 Williams ................ A01M 5/08 15/422
2,389,677 A * 11/1945 Mccay .................... A01M 5/08 43/140
2,412,181 A * 12/1946 Smith ..................... A01M 5/08 43/140
2,419,353 A * 4/1947 Henley ................... A01M 5/08 43/140
2,514,898 A * 7/1950 Ramsey ................. A01D 46/08 43/140
2,517,292 A * 8/1950 Dewey .................... A01M 5/08 43/142
2,530,893 A * 11/1950 Mcelreath ............... A01M 5/08 43/143
2,567,616 A * 9/1951 Moore .................. A01M 1/223 43/112
2,608,023 A * 8/1952 Dillon ................... A01M 15/00 43/140

(56) References Cited

U.S. PATENT DOCUMENTS

| | | | | | |
|---|---|---|---|---|---|
| 2,643,482 | A * | 6/1953 | Wilson | A01M 5/08 | 15/313 |
| 2,722,082 | A * | 11/1955 | Nisbet | A01M 5/08 | 43/141 |
| 3,846,932 | A * | 11/1974 | Bialobrzeski | A01M 5/00 | 43/138 |
| 3,872,472 | A * | 3/1975 | Moschgat | B06B 1/0284 | 340/384.2 |
| 4,219,884 | A * | 8/1980 | DeSantis | A01M 1/023 | 43/124 |
| 4,566,085 | A * | 1/1986 | Weinberg | B06B 1/0276 | 116/22 A |
| 4,683,673 | A * | 8/1987 | Taylor | A01M 5/08 | 43/139 |
| 4,825,582 | A * | 5/1989 | Szynal | A01M 5/08 | 43/140 |
| 5,028,002 | A * | 7/1991 | Whitford | A01M 7/0014 | 47/1.7 |
| 5,117,578 | A * | 6/1992 | Theis | A01M 5/08 | 43/140 |
| 5,141,059 | A * | 8/1992 | Marsh | A01M 21/04 | 47/1.3 |
| 5,214,876 | A * | 6/1993 | Sukup | A01M 5/08 | 43/140 |
| 5,255,469 | A * | 10/1993 | Sukup | A01M 5/08 | 43/140 |
| 5,974,728 | A * | 11/1999 | Nichols | A01M 21/04 | 43/140 |
| 6,009,765 | A * | 1/2000 | Forsen | A01M 5/08 | 73/864.33 |
| 6,401,637 | B1 * | 6/2002 | Haller | A01M 1/226 | 111/118 |
| 6,685,389 | B1 * | 2/2004 | Christensen | E01C 23/18 | 404/12 |
| 8,544,419 | B1 * | 10/2013 | Spalding | A01M 1/06 | 119/656 |
| 8,737,170 | B2 * | 5/2014 | Kasper | A01M 29/18 | 367/139 |
| 9,532,562 | B2 * | 1/2017 | Ganmor | A01M 5/00 | |
| 9,807,996 | B1 * | 11/2017 | Yu | B64U 50/37 | |
| 10,021,871 | B1 * | 7/2018 | Cogley | A01M 1/06 | |
| 10,393,357 | B2 * | 8/2019 | Niemiec | F21S 8/061 | |
| 10,463,036 | B2 * | 11/2019 | Tugel | A01M 5/02 | |
| 10,729,122 | B1 * | 8/2020 | Simon | A01M 5/08 | |
| 10,993,429 | B2 * | 5/2021 | Tugel | A01M 3/00 | |
| 11,653,642 | B2 * | 5/2023 | Salter | G06V 20/56 | 367/139 |
| 11,678,653 | B1 * | 6/2023 | Cogley | A01M 5/04 | 43/111 |
| 12,089,587 | B1 * | 9/2024 | Tugel | A01M 1/06 | |
| 2006/0186115 | A1 * | 8/2006 | Joines | A01M 1/226 | 219/678 |
| 2007/0074447 | A1 * | 4/2007 | Kalogroulis | A01M 1/106 | 43/107 |
| 2008/0010897 | A1 * | 1/2008 | Palm | A01M 1/2016 | 43/132.1 |
| 2012/0137569 | A1 * | 6/2012 | Younts | A01M 3/005 | 43/139 |
| 2013/0077446 | A1 * | 3/2013 | Kasper | A01M 29/18 | 367/139 |
| 2014/0169138 | A1 * | 6/2014 | Lee | A01M 1/24 | 43/2 |
| 2014/0334268 | A1 * | 11/2014 | O'Hara | H04B 1/713 | 375/135 |
| 2015/0264913 | A1 * | 9/2015 | Ganmor | A01M 5/02 | 43/139 |
| 2016/0262365 | A1 * | 9/2016 | VanDeKieft | A01M 5/08 | |
| 2017/0020122 | A1 * | 1/2017 | Mirzakhani Nafchi | A01M 19/00 | |
| 2018/0027796 | A1 * | 2/2018 | Tugel | A01M 1/223 | |
| 2019/0113219 | A1 * | 4/2019 | Niemiec | F21V 33/0092 | |
| 2019/0141981 | A1 * | 5/2019 | Simon | A01M 1/06 | 43/111 |
| 2019/0223425 | A1 * | 7/2019 | Tugel | A01M 1/06 | |
| 2020/0323191 | A1 * | 10/2020 | Duncan | G05D 1/0088 | |
| 2022/0217908 | A1 * | 7/2022 | Cazenave | F04D 27/007 | |
| 2024/0023537 | A1 * | 1/2024 | Coutinho Filho | A01M 19/00 | |
| 2025/0185640 | A1 * | 6/2025 | Tugel | A01M 1/06 | |
| 2025/0234852 | A1 * | 7/2025 | Tugel | A01M 5/04 | |

FOREIGN PATENT DOCUMENTS

| | | | | | |
|---|---|---|---|---|---|
| CN | 213155668 | U * | 5/2021 | | |
| CN | 213307020 | U * | 6/2021 | | |
| CN | 113455490 | A * | 10/2021 | A01M 29/12 | |
| CN | 114794077 | A * | 7/2022 | A01M 1/14 | |
| CN | 216931617 | U * | 7/2022 | | |

* cited by examiner

BUG-REMOVAL VACUUM MACHINE

CROSS-REFERENCE TO RELATED APPLICATIONS

The instant application is a continuation-in-part application of co-pending application U.S. Ser. No. 18/773,349 filed Jul. 15, 2024, which is a divisional application of U.S. Ser. No. 18/532,823 filed Dec. 7, 2023, Issued as U.S. Pat. No. 12,089,587 on Sep. 17, 2024. All disclosure of the parent applications is incorporated at least by reference.

BACKGROUND OF THE INVENTION

1. Field of the Invention

The present invention is in the technical area of combatting insect infestation in crops and pertains more particularly to a machine incorporating vacuum for efficiently removing insects from plants.

2. Description of Related Art

Vacuum-operated machines are known in the art for operating over plants, for dislodging and killing insects that feed on the growing plants.

The present inventor is the inventor in previously issued US Patents claiming vacuum apparatus for bug removal, including U.S. Pat. No. 10,463,036 issued Nov. 5, 2019 and U.S. Pat. No. 10,993,429 issued May 4, 2021. The present application discloses and claims significant improvements to the previous.

BRIEF SUMMARY OF THE INVENTION

In an embodiment of the invention a vacuum machine for capturing insects is provided, comprising a substantially flat deck with a front edge, a rear edge, first and second side edges, a length and a width, having a carrying interface at the rear edge adapted to attach the vacuum machine to a tractor or other vehicle for translation in use, a first side wall extending downward from the first side edge and a second side wall extending downward from the second side edge, an opening through the deck with a length in the direction of the width of the deck and width less than the length of the opening in the direction of the length of the deck, a first plenum affixed to an upper surface of the deck, the plenum having a lower periphery enclosing the opening through the deck and a height to an upper circumferential edge, a fan assembly having a fan housing with an upper and a lower periphery joined by the lower periphery to the upper circumferential edge of the first plenum, the fan assembly having a first internal fan driven by a motor, the fan adapted to draw air upward from the opening through the deck, through the first plenum, one or more perforated panels in a second plenum joined to the fan housing at the upper periphery of the fan housing, the one or more perforated panels having openings of a size and geometry to destroy insects drawn through the openings, one or more ultrasonic transmitters positioned in a structural element on a forward portion of the vacuum machine, oriented to transmit in a direction of travel of the vacuum machine, and power circuitry coupled to the one or more ultrasonic transmitters providing electrical power producing an ultrasonic wave projecting forward in the direction of travel of the vacuum machine.

In one embodiment the ultrasonic transmitters are positioned in a back panel of an insect shroud facing forward on a front region of the vacuum machine.

In one embodiment a vacuum machine for capturing insects is provided, comprising a substantially flat deck with a front edge, a rear edge, first and second side edges, a length and a width, having a carrying interface at the rear edge adapted to attach the vacuum machine to a tractor or other vehicle for translation in use, a first side wall extending downward from the first side edge and a second side wall extending downward from the second side edge, an opening through the deck with a length in the direction of the width of the deck and width less than the length of the opening in the direction of the length of the deck, a first plenum affixed to an upper surface of the deck, the plenum having a lower periphery enclosing the opening through the deck and a height to an upper circumferential edge, a fan assembly having a fan housing with an upper and a lower periphery joined by the lower periphery to the upper circumferential edge of the first plenum, the fan assembly having a first internal fan driven by a motor, the fan adapted to draw air upward from the opening through the deck, through the first plenum, one or more perforated panels in a second plenum joined to the fan housing at the upper periphery of the fan housing, the one or more perforated panels having openings of a size and geometry to destroy insects drawn through the openings, one or more electromagnets implemented in a structural element on a forward portion of the vacuum machine, oriented to project a magnetic field in a direction of travel of the vacuum machine, and power circuitry coupled to the one or more electromagnets providing electrical power producing a magnetic field forward in the direction of travel of the vacuum machine. In one embodiment the electromagnets are positioned on or behind a back panel of an insect shroud facing forward on a front region of the vacuum machine.

DETAILED DESCRIPTION OF THE INVENTION

Figure 1:
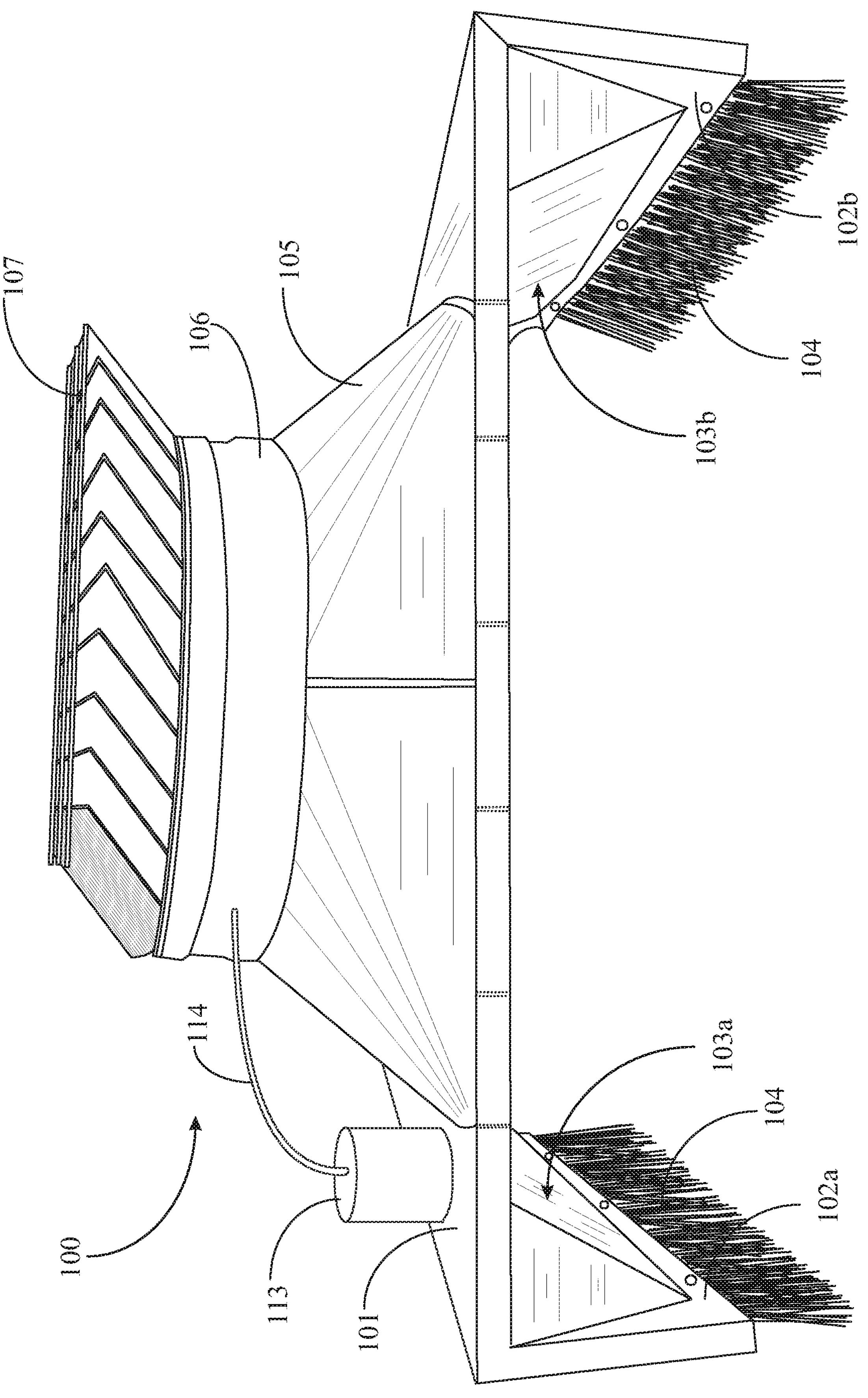
FIG. 1 is a front elevation view of a portion of a vacuum machine in an embodiment of the invention.

Referring now to FIG. 1, a partial structure 100 of an insect-removal machine is shown in perspective in an elevation view from in front of the machine. Structure 100 is in part based on a deck 101, which may be fabricated from a metal like aluminum, or other suitable material. There are two side walls 102*a* and 102*b* extending downward from opposite edges of deck 101, and brushes 104 fastened along a bottom edge of each of sidewalls 102. The brushes trail along ground level and provide for variation in the height at which structure 100 may be carried along and over growing plants, from which it may be desired to remove insects. In some circumstances, the brushes may contact the ground and be somewhat deformed, and in other instances the brushes may travel a short distance above ground level. The brushes also provide a barrier to air entering the structure from the sides below the side walls. In some embodiments the brushes are not used.

A plenum 105 connects between an opening 116 (see FIG. 2) in deck 101 and a fan assembly 106, comprising at least one fan, which fan or fans force air upward out of the structure from the plenum, and in some embodiments through a killing mechanism 107, which serves to kill insects drawn into and through the structure. The killing mechanism may take several forms, but is, in exemplary embodiments, a matrix of panels or wires formed over the path of the airflow from the blower, the matrix electrically charged in a manner that insects coming into contact with elements of the matrix are electrocuted.

The electrical grid is not always used, and in some embodiments a reservoir 113 contains a vinegar solution. There may be a 12-volt powered pump providing the solution through a line 114 to a spray nozzle pointed to the fan in the airstream below the fan. The vinegar solution is known by the inventor to be lethal to insects captured.

The opening through the deck is shown in enabling detail in FIG. 2 as opening 116 described below. In some embodiments there are two baffle elements 103*a* and 103*b* positioned inside of each of side walls 102, and the baffle elements guide air drawn into the region between the side walls upward to and through the opening in the deck. In some other embodiments baffle elements 103*a* and 103*b* are not present.

Figure 2:
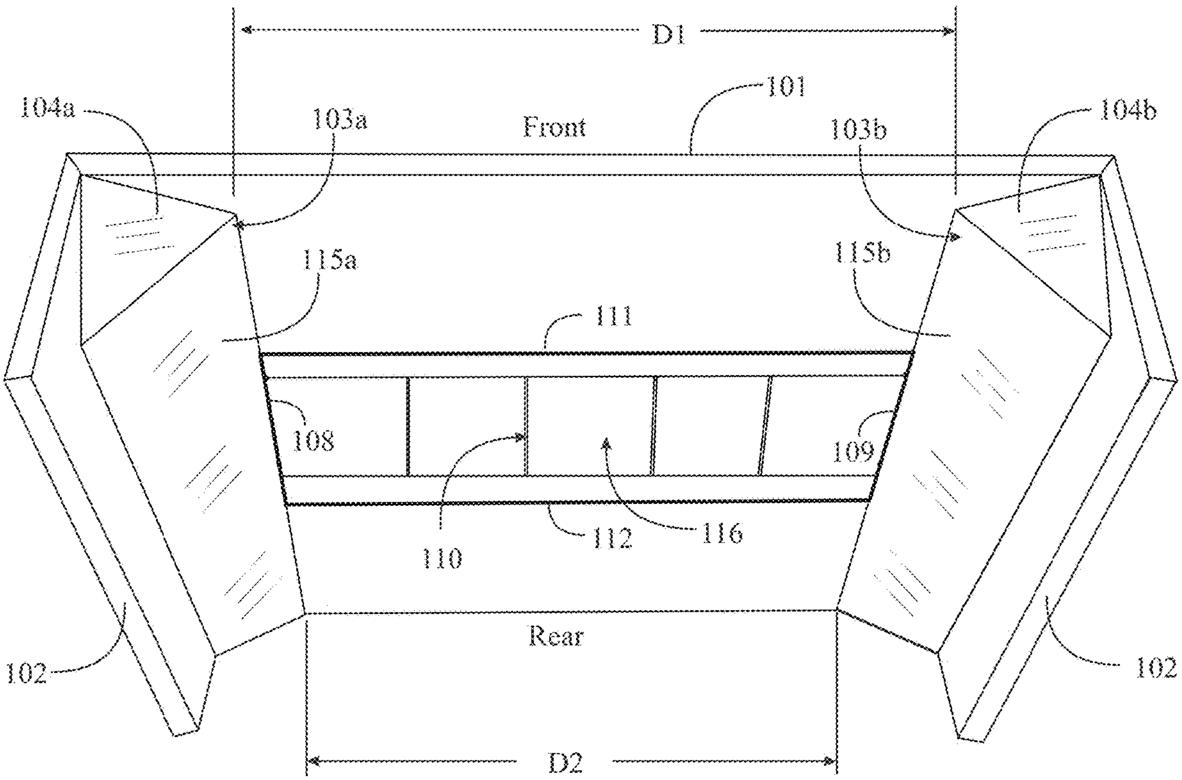
FIG. 2 is a view from underside of the vacuum machine structure of FIG. 1.

FIG. 2 is a view from underside of the vacuum machine of FIG. 1. The opening through deck 101 referred to above, but not seen in FIG. 1, is seen in FIG. 2 as opening 116 defined by long edges 111 and 112, across the width of the structure, and short edges 108 and 109 in the direction of the length of the structure, in the direction of travel in use. Baffles 103*a* and 103*b* are mirror images of one another, and comprise a triangular cross section, with one baffle positioned along the inside of side wall 102 on each side of the machine. Baffle 103*a* has a front surface 104*a*, and a side surface 115*a*, while baffle 103*b* has a front surface 104*b* and a side surface 115*b*. It may be seen in FIG. 2 that an inside edge of baffle 103*a* coincides with edge 108 of opening 116, and an inside edge of baffle 103*b* coincides with edge 109 of the opening.

The front of the baffle structure at the deck level, represented by dimension D1, is wider than at the rear of the machine, represented by dimension D2. This tapered effect causes the opening through the deck to be trapezoidal in nature, such that edges 111 and 112 are parallel, but edge 111, being closer to the front, is a bit longer than edge 112, which is closer to the rear. Opposite edges 108 and 109 are of the same length but extend at opposite angles. A welded matrix of rods 110 are not essential to the invention but form a barrier for relatively large debris that might be drawn into the machine in operation, such as soda cans, plastic membranes, and the like. This matrix may be more closely spaced, or less closely spaced, in alternative embodiments, or may be left out altogether.

An important purpose of baffles 103*a* and 103*b*, and the placement of the baffles, particularly the edges coinciding with the edges of the opening through the deck, is to control and guide air flow into the structure, and upward into plenum 105, to best advantage. Referring again to FIG. 1, structure 100 in that view is upright in an aspect that the machine would be carried by a tractor along a path, with side walls 102 spanning opposite sides of one or more rows of plants in the path, with brushes 104 trailing at or near ground level. Two or more structures 100 may be carried side by side and spaced laterally to service more rows of plants simultaneously. The direction of travel is, in one embodiment, with the wide end forward, which in FIG. 1 implies that the machine would traverse toward the viewer.

As structure 100 is carried along a path, fan assembly 106 operates at high capacity to draw air, primarily from the front of the structure, over and around the details of plants, capturing insects from the plants, and upward through plenum 105, and out through killing mechanism 107. The air moved by the blower is drawn in from primarily the front of the machine above and on both sides of plants in the path, and is guided inward by the tapered shape of the baffles and side walls, which serves to increase the velocity of the air, and then upward by surfaces 115*a* and 115*b* of the baffles, and the air enters the opening through the deck with a strong upward component of flow. In the figures, the surfaces 115*a* and 115*b* are depicted as essentially planar, but in some cases, there may some curvature to the guiding surface. The more important feature is that the edges of the baffles align with the edges of the opening through the deck.

In prior art structures, the side walls are typically curved from vertical to horizontal, and there are no baffles, so air is directed horizontally over the opening through the deck, from both sides, creating a collision situation wherein a substantial portion of the air drawn in at first is not guided into and through the opening, but is deflected turbulently downward, such that insects are not efficiently trapped and drawn into the turbine and into the killing mechanism 107.

Figure 3:
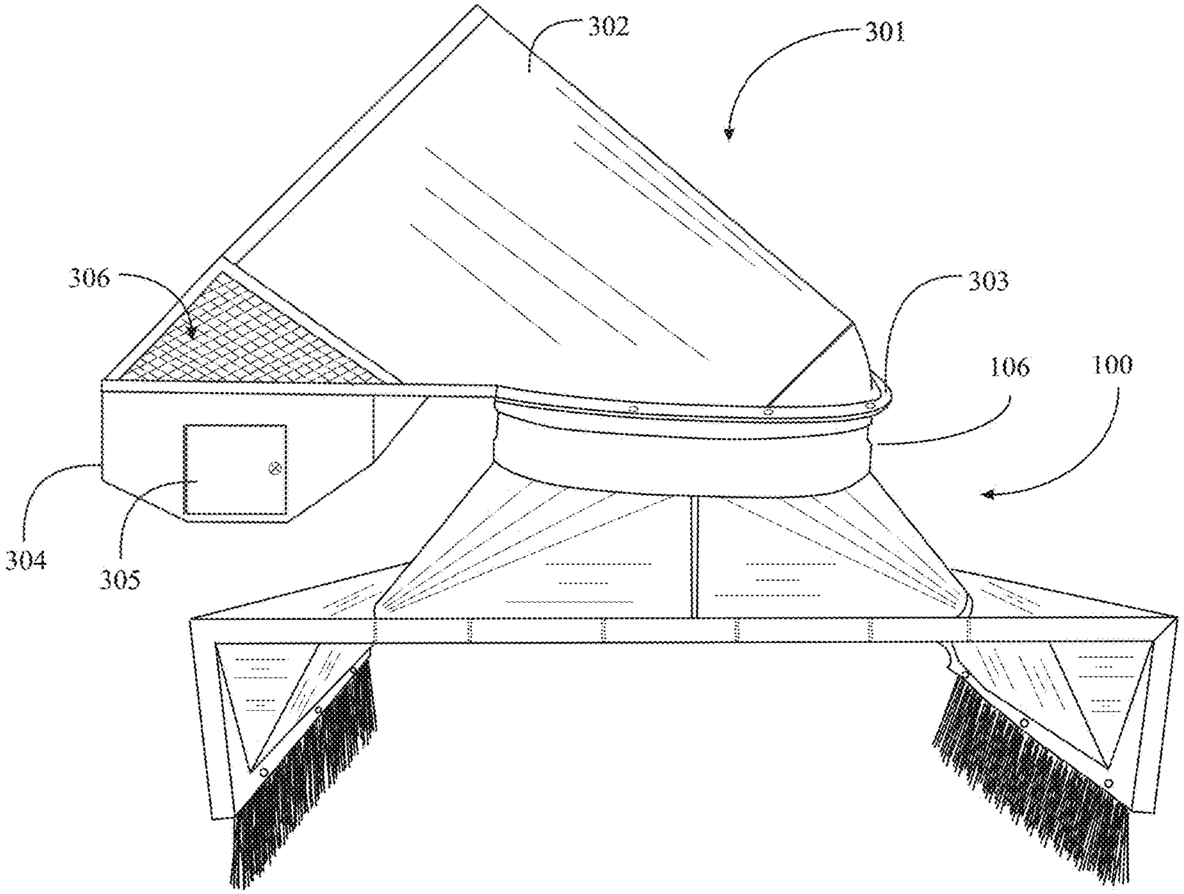
FIG. 3 is a perspective view of the vacuum apparatus of FIGS. 1 and 2 with an additional capturing component.

FIG. 3 is a perspective view of the insect-gathering structure 100, with an additional structure 301 for capturing and collecting insects, typically dead insects, that have been drawn from plants through fan assembly 106. Structure 100 and structure 301 together comprise a bug-removal and collection machine. Capturing structure 301 comprises a flange 303, to mate with a companion flange as part of structure 100, a hood-like semi-cylindrical structure 302, and a collection tray 304 below the level of flange 303 to one side. The tray is for collecting insects and portions of insects that are captured and suctioned through fan assembly 106. In embodiments incorporating this capture structure it is necessary that the upper extremity of structure 100 have a flange matching that of structure 301, enabling the two units to be joined, and for the capture structure to be removed at need, to access and maintain or repair portions of both units, such as the blower and the screens 107 described above.

Captured insects drawn through fan assembly 106 are directed with the flow of air induced by the blower to one side, toward the capture tray 304. A portion of sides of structure 302, labeled 306 in FIG. 3, is restricted only by an expanded metal screen in one embodiment, and there is a similar opening above the capture tray at the other end of the capture tray. In one embodiment, the capture tray may be removably mounted to the structure, and in other embodiments the tray may be a contiguous part of the structure. In some embodiments, there is a door 305 enabling removal of insects and debris. A purpose of screens 306 is to allow air to escape the structure, rather than creating a back-pressure that would impair the operation of the machine.

Figure 4:
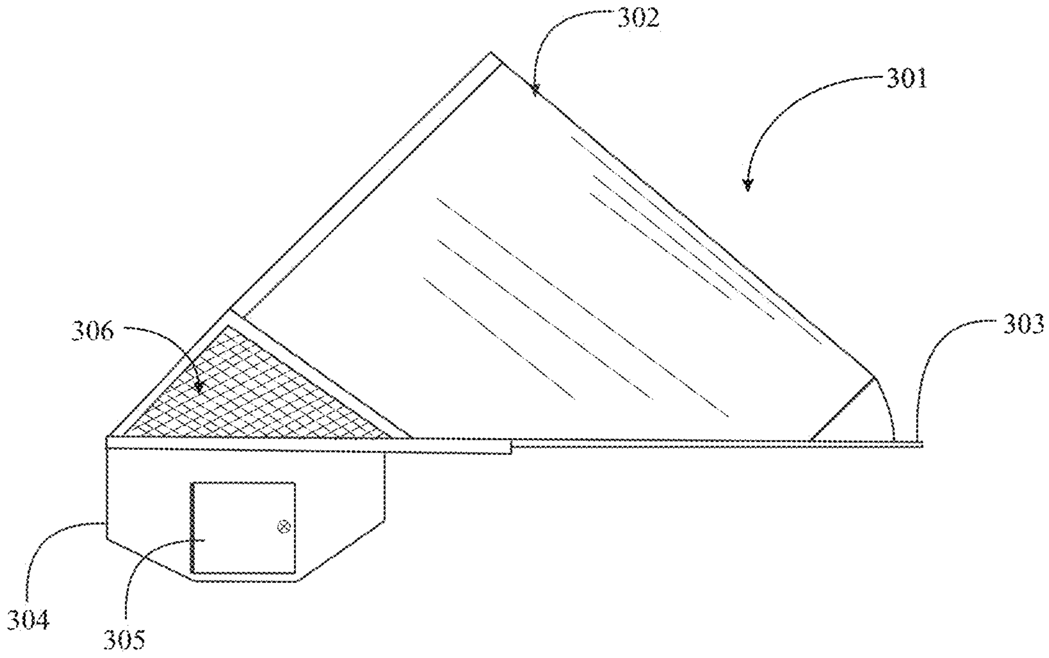
FIG. 4 is an elevation side view of the capturing component of FIG. 3, in an embodiment of the invention.
Figure 5:
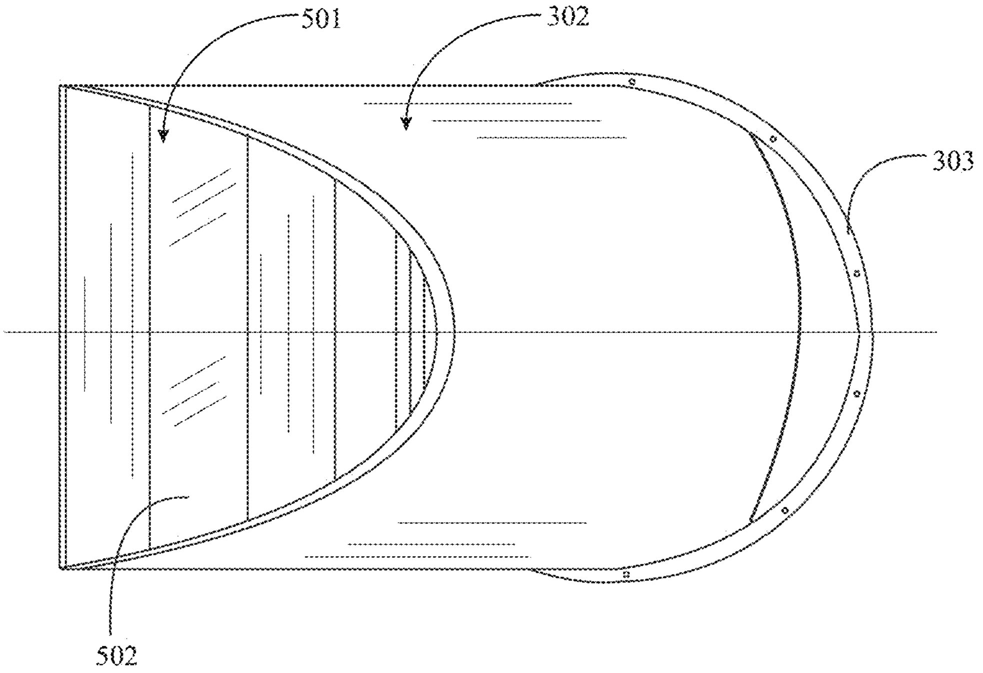
FIG. 5 is a top plan view of the capturing component of FIG. 4.

FIG. 4 is a side elevation view of structure 301 showing the capture structure removed from the blower structure at the flange interface. FIG. 5 is a top plan view of capture structure 301 showing the flange 303 and the relationship of the hood structure 302 to the flange and the capture tray. End 501 of the hood structure is shown completely open in this view, and horizontal surface 502 is the bottom of tray 304. In most embodiments opening 501 is covered with an expanded metal screen, as is shown for opening 306 in FIG. 3. The screen is not shown, so detail below the screen may be better displayed in the figure.

A purpose of openings 306 and 501 is to provide very little restraint for air brought up through the blower, such that the air easily expands and the pressure drops, so insects entrained will tend to fall into the collection tray rather than be expelled through the screened openings.

In one embodiment, the collection structure is aluminum, and it is desirable that the weight of the structure be minimized. Other metals may also be suitable, and the structure is not limited to aluminum. In some embodiments, the bug-vacuum machine in embodiments of the invention is carried by a tractor as a suspended cantilever structure. I other embodiment, the machine may be mounted on a rolling structure, having wheels that roll along the ground.

Figure 6:
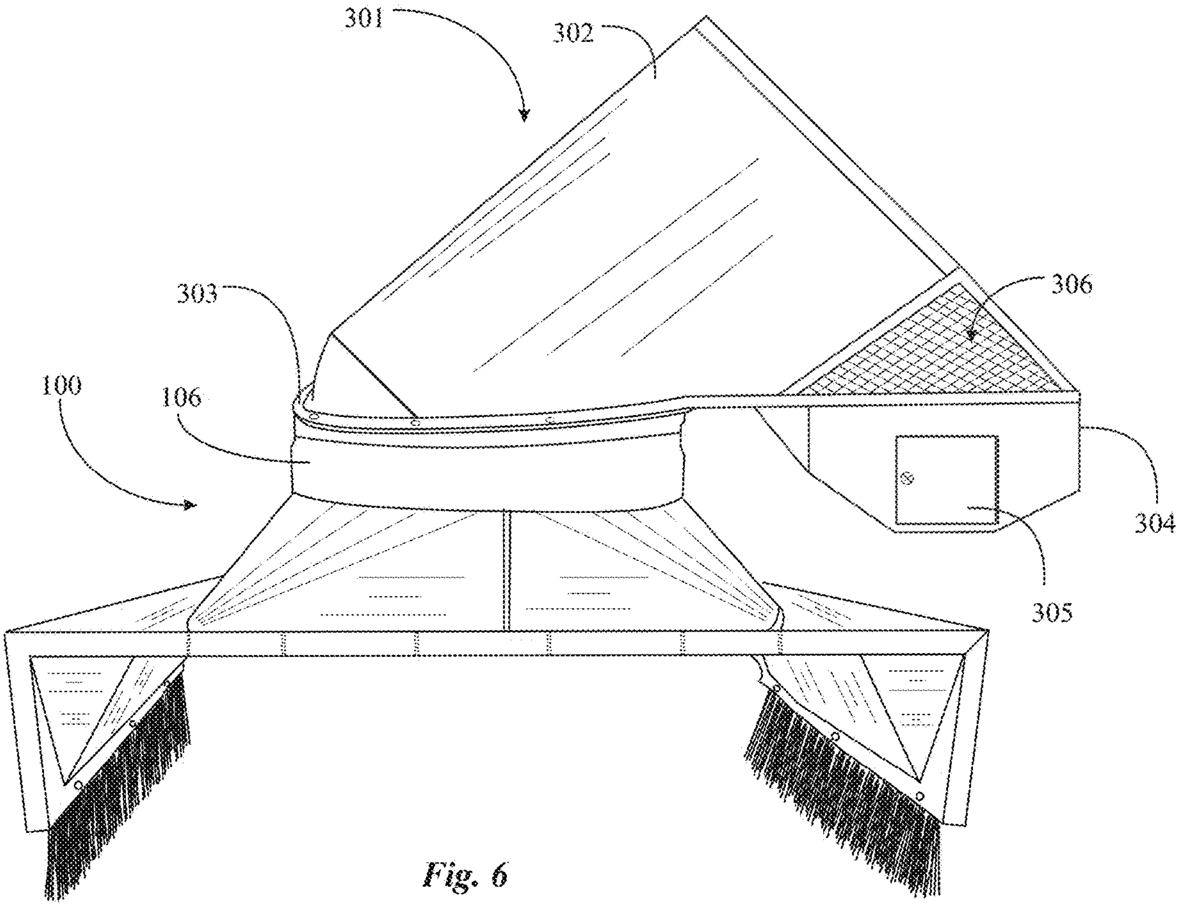
FIG. 6 is a perspective view of the vacuum apparatus of FIGS. 1, 2 and 3 with an upper portion revolved by 180 degrees.

FIG. 6 is a perspective view of the vacuum apparatus of FIGS. 1, 2 and 3 with upper portion 301 revolved by 180 degrees. This re-orientation is readily accomplished, as the lower and upper portions are joined by flange interface 303. As stated elsewhere in this specification, the direction of travel is toward the wider end, which will be toward the viewer in both FIGS. 3 and 6. The entire structure is suspended from the forward structure of a tractor and propelled forward by the tractor as shown and described below.

Figure 7:
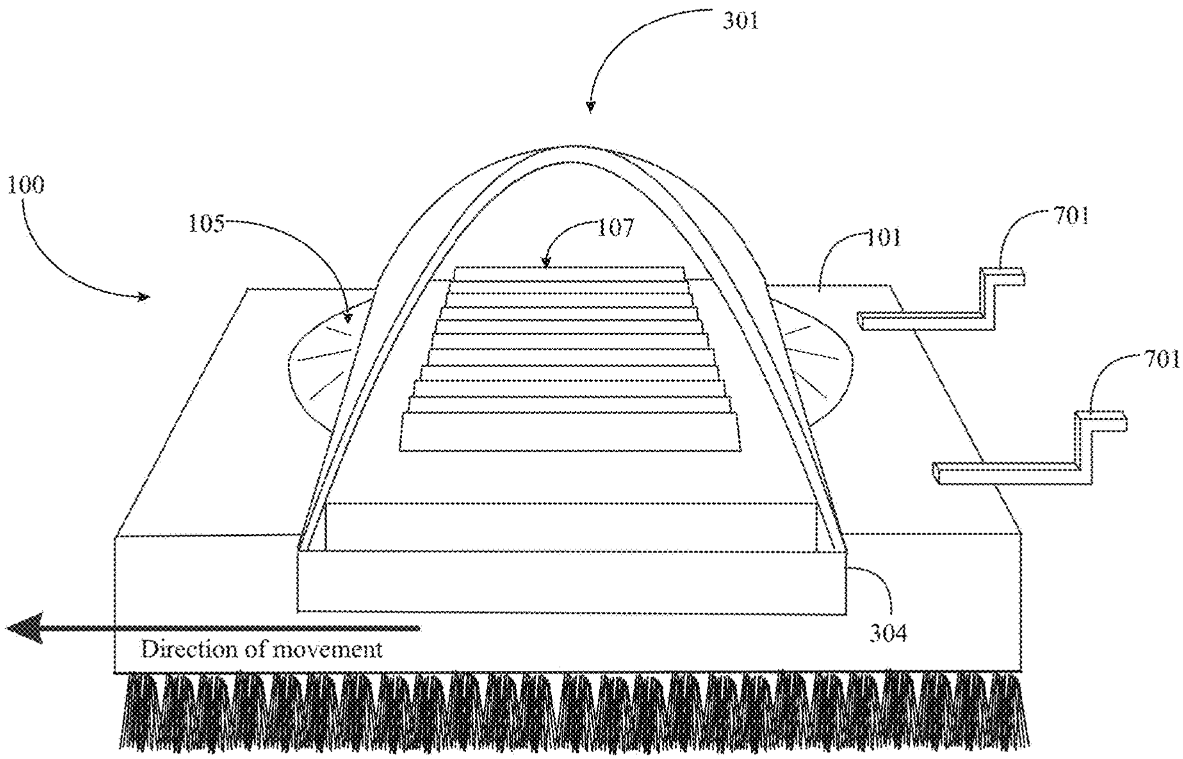
FIG. 7 is a side elevation view of the vacuum apparatus of FIG. 6, with the apparatus of FIG. 6 rotated ninety degrees with the wider portion of the vacuum apparatus propelled to the left.

FIG. 7 is a side elevation view of the vacuum apparatus of FIG. 6, with the apparatus of FIG. 6 rotated ninety degrees with the wider portion of structure 100 propelled to the left, as seen by the arrow in FIG. 7. In this view the collector apparatus 301 has opening 501 toward the viewer. As described with reference to FIG. 3 above, opening 501 is covered with an expanded metal screen, but the screen is removed in this view to show internal structure. Killing structure 107 is, as described above, in this instance a matrix of panels or wires formed over the path of the airflow from the blower, the matrix electrically charged in a manner that insects coming into contact with elements of the matrix are electrocuted. The dead insects are not collected in this structure but carried with the airflow into a region of expanding volume to slow the air velocity. The dead insects drop into collector tray 304, and the air continues out through the expanded metal screen over opening 501, in this case, to the left of the direction of movement of the vacuum apparatus. In this embodiment two carrier structures 701 are shown bolted or welded to deck 101. These structures interface with carrier apparatus on the front of the tractor that carries and propels the vacuum apparatus. The tractor interface is capable of raising and lowering the vacuum apparatus to adjust the relationship with plants and the ground level.

Figure 8:
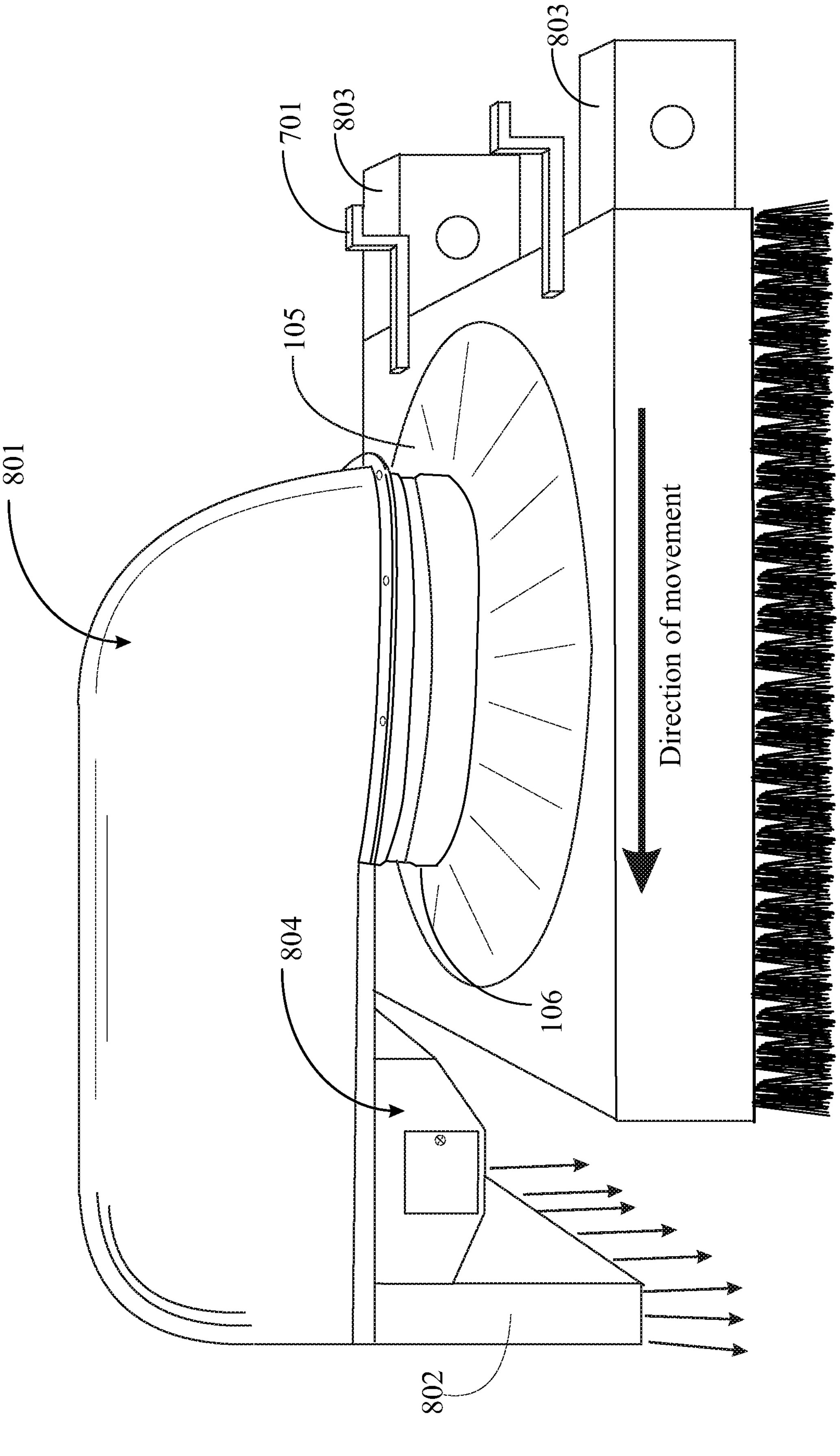
FIG. 8 is a side elevation view of a vacuum apparatus in yet another embodiment of the invention.

FIG. 8 is a side elevation view of a vacuum apparatus in another embodiment of the invention. In the embodiment represented in FIG. 8 the lower part of the apparatus, illustrated in detail in FIGS. 1 and 2 in particular, is unchanged, including the electrified panels 107, which are present but not shown in FIG. 8. A new upper structure 801 is provided in place of structure 301 of FIG. 3. Structure 801 fastens to flange 303 of the lower assembly by a mating flange.

Upper structure 801 channels air, after passing through the panels 107 upward and forward, in the direction of movement of the vacuum apparatus as carried by a tractor or other vehicle. Dead insects drawn into the apparatus are carried along, and removed to trough 804, similar to trough 304 in FIG. 3, by a moving screen not shown in FIG. 8 but described in enabling detail in FIG. 9. Air passing through the insect removal screen is then directed downward in a passage 802, creating an air curtain across the width of the apparatus at a short distance in front of the leading edge of the apparatus.

The inventor has discovered that insects often try to escape the apparatus by flying forward in the direction of travel of the apparatus, as the apparatus approaches. The air curtain provided by the air directed downward through passage 802 prevents such escape and draws these insects into the apparatus as well. The air curtain provided by downward-directed passage 802 also serves to dislodge insects on plants.

A further functionality of the apparatus depicted exemplary in FIG. 8 is that the air passing through the system is re-circulated, entering and passing through the apparatus again and again. Such recirculation tends to maximize capture of live insects and disposal of dead insects.

Further to the above, in the embodiment represented by FIG. 8 two additional auxiliary blowers 803 are positioned near the rearward corners of the apparatus, and direct air drawn into the blowers into the rearward interface of the apparatus and may be selectively aimed upward and inward toward plants over which the apparatus may be passing. Adjustment to the direction, and in some cases the volume, of air from these auxiliary blowers may be made differently for different plants.

Figure 9:
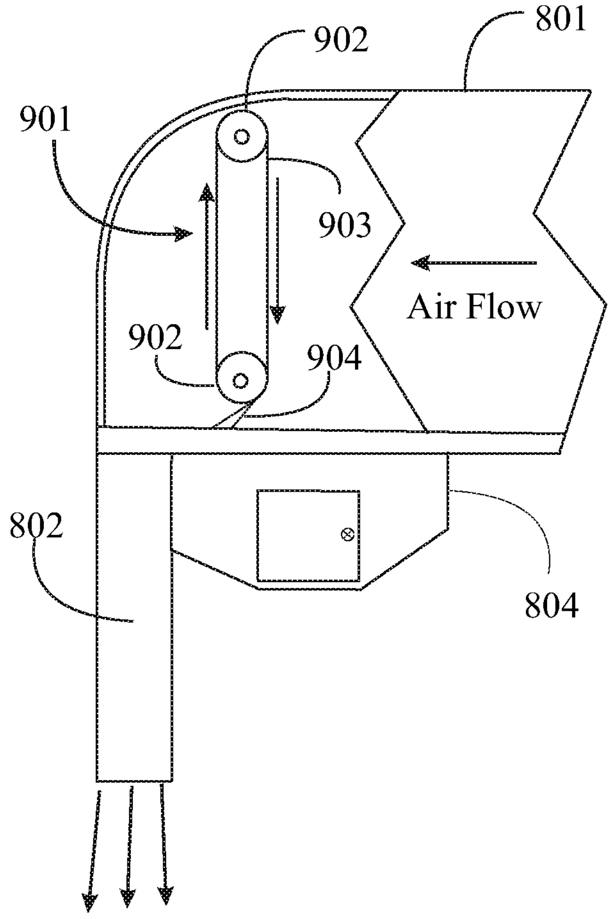
FIG. 9 is a partial section view of a portion of structure 801 of FIG. 8.

FIG. 9 is a partial section of the apparatus of FIG. 8 taken at the location of trough 804 showing a screen conveyor placed in the path of air in structure 801, to efficiently remove dead insects in the air to trough 804. A portion of the outer walls of structure 801 is shown removed to illustrate the screen conveyor inside.

In this example screen conveyor 901, comprising a continuous screen 903 is implemented over two pulleys 902 at least one of which is motor-driven, so the screen conveyor moves in a continuous path as shown by arrows. Air passing to the left in the figure, from the blower, entraining insects, mostly dead, passes through the opposite layers of the moving screen. Dead insects are caught on the outer surface of the descending screen that is the first layer the air encounters. Dead insects are held against the screen by the pressure of the moving air, and at the bottom, just above collection trough 804, the dead insects drop off the screen into the collection trough. A scraper 904 may be implemented at this point to be sure all insects come off the screen, rather than being carried back around the moving conveyor.

Figure 10:
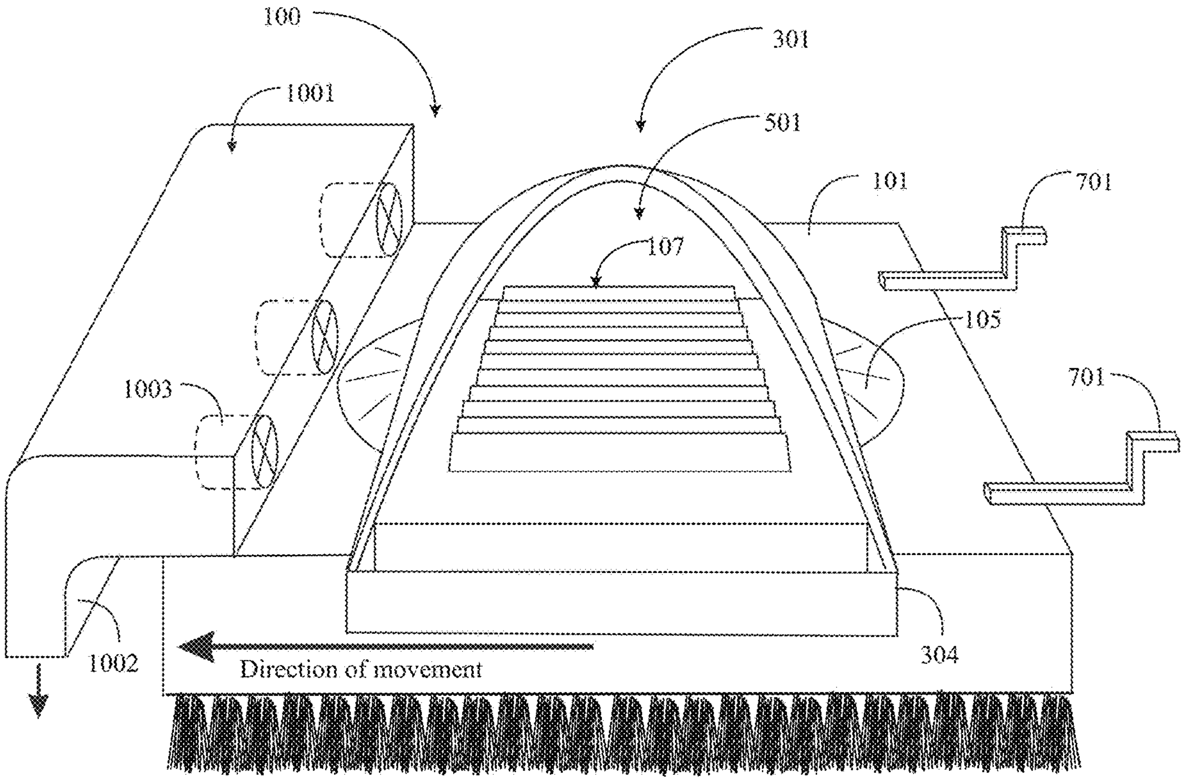
FIG. 10 is a perspective view of a machine with air projected to the front in an embodiment of the invention.

FIG. 10 illustrates a bug-removal vacuum machine 301 with the exhaust from the blower directed to one side, in this instance toward the front of the page with the machine moving to the left. In this example there is a plenum 1001 along the front with blowers 1003 directing air into the plenum and down through a vertical channel onto plants ahead of the travel of the machine, to dislodge insects from plants before the main part of the machine reaches the plants.

Figure 11:
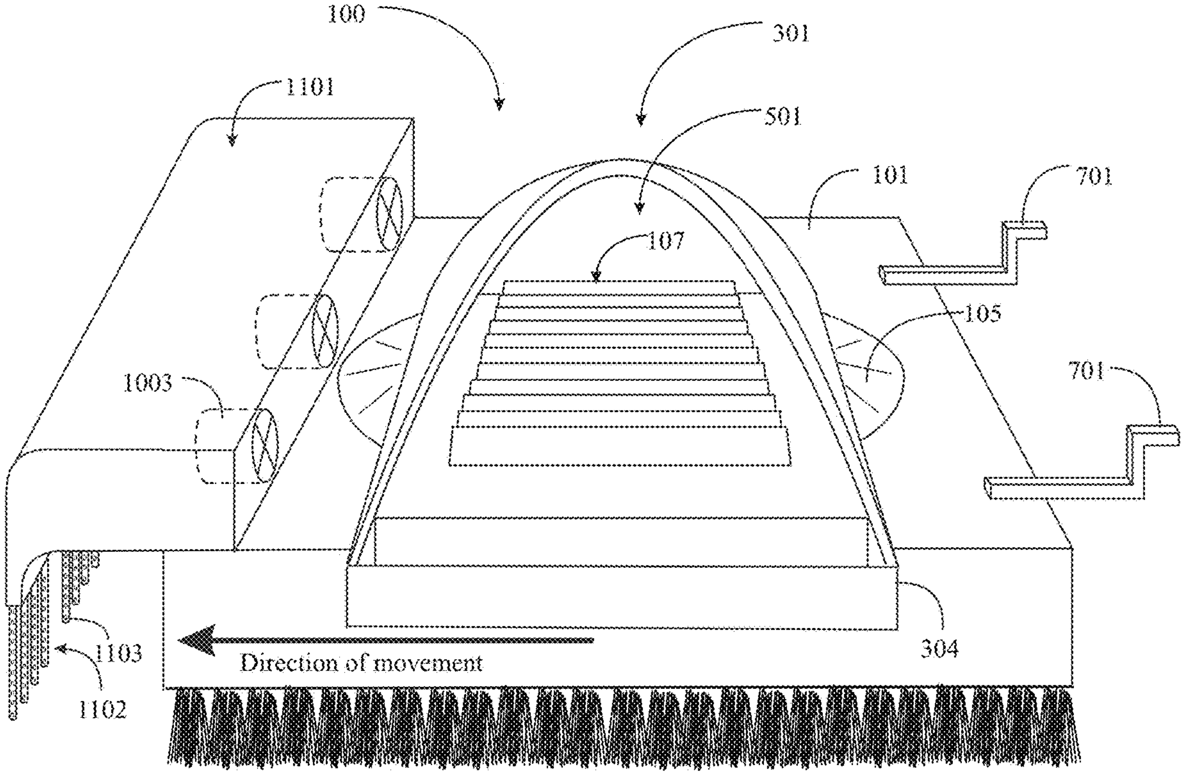
FIG. 11 is a perspective view of a machine with air directed to the front in individual channels in an embodiment of the invention.

FIG. 11 illustrates a bug-removal machine similar to that shown in FIG. 10, having separate channels 1102 in distinct groups directed downward from plenum 1101. Channels 1102 are of a length to reach nearly to ground surface and spaced laterally to travel between rows of plants. Each channel 1102 has air outlets 1103 directed to the side to impinge on plants from between the rows of plants.

In yet another aspect of the invention panels similar to panels 107 are provided, except that the panels are not, in one embodiment electrified, as described above for panels 107. Panels 107 are provided in a matrix, as side-by side panels, immediately after the blower in embodiments of the invention, such that insects entrained in the air flow drawn from below by fan assembly 106 (FIG. 1) are forced to pass through the matrix of panels. After passing the panels, the air flow is changed in direction from upward to horizontal by the shape of plenums 302, for example.

Figure 12A:
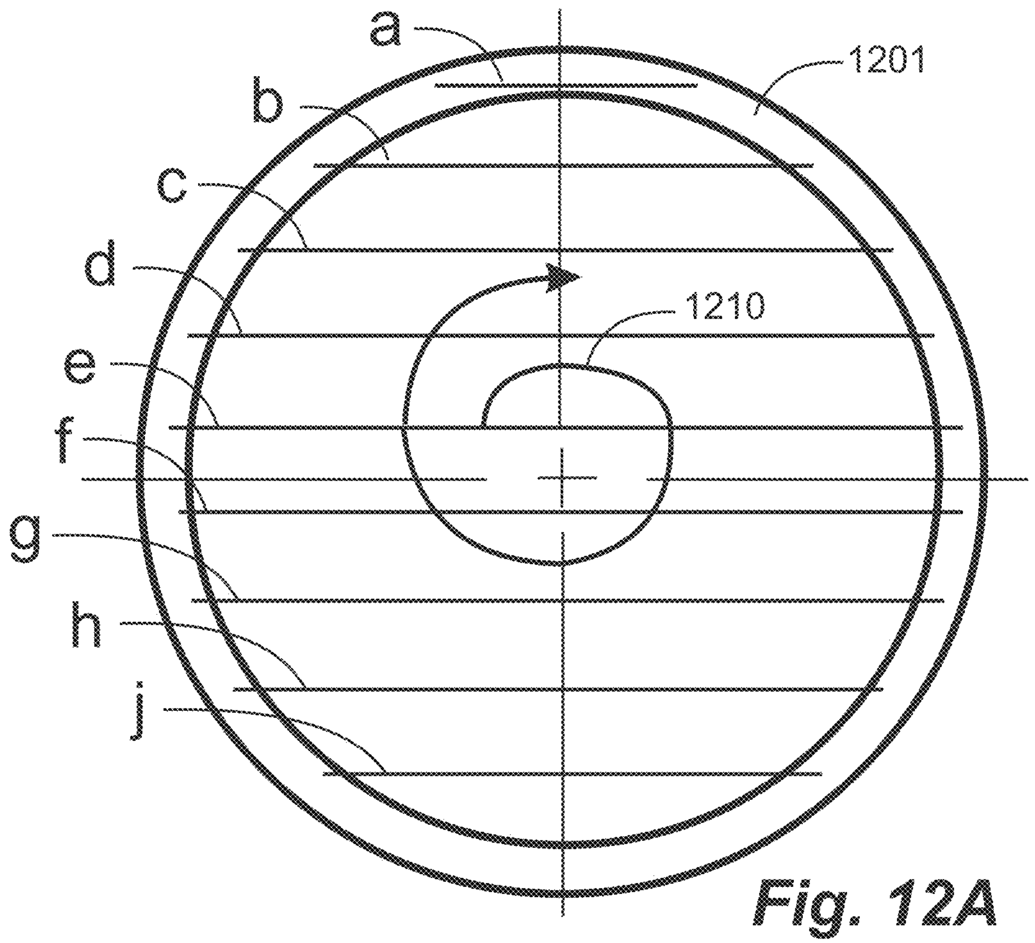
FIG. 12A is a plan view from above of a killing mechanism in an alternative embodiment of the invention.

FIG. 12A is a plan view from above, looking down on a flange 1201 which is sized to mate with the flange at the outlet to fan assembly 106 as seen in FIG. 3. In this alternative embodiment of the invention a new killing mechanism is provided with a panel assembly affixed at the outlet from the blower, spot welded in one embodiment, to flange 1201. In one implementation the new panel assembly comprises nine panels. Lines a through j in FIG. 12A indicate where each of nine panels contact flange 1201.

Figure 12B:
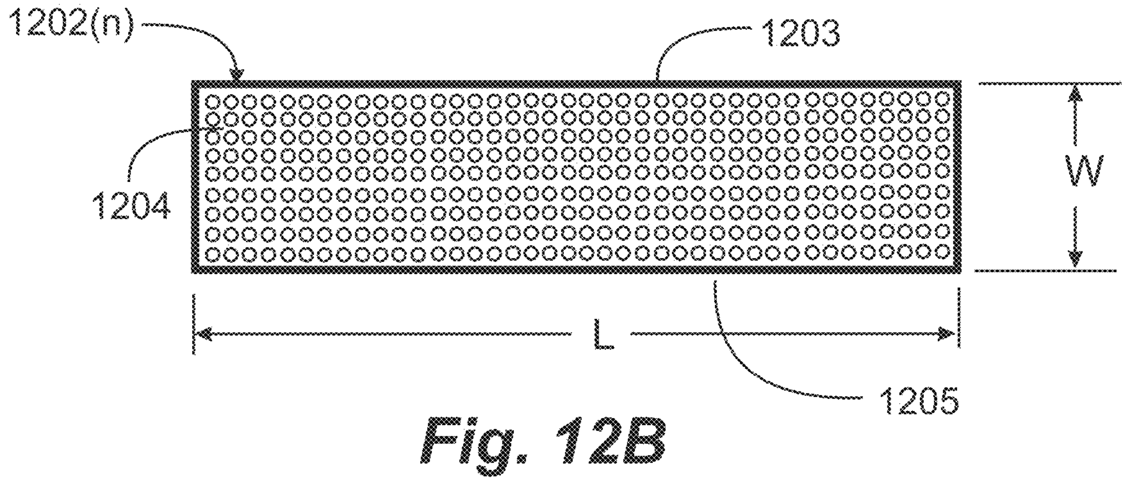
FIG. 12B is a plan illustration of a panel representing the construction of each of nine panels in the assembly of the new killing mechanism of FIG. 12A.

FIG. 12B is a plan illustration of a panel 1202(*n*), representing the construction of each of nine panels in the assembly of the new killing mechanism. Panel 1202(*n*) has a width "W", which is common to each of the nine panels in this example, and a length "L" which may be different for each of the nine panels. Each panel comprises an outer frame, which may be a round metal bar in one implementation, having a top edge 1203 and a bottom edge 1205. A relatively thin perforated metal sheet 1204 is welded to the frame. The perforation comprises a matrix of holes that may each have a common diameter. The pattern and the diameter of the holes in the perforated panel may vary in different applications, in part depending on the nature of insects that are expected to be captured by the vacuum apparatus of the invention.

The difference in length L for each of the panels may be seen in FIG. 12A. A panel to lay along line a, for example will have the length of line a, and a panel to lay along line e will have the length of line e.

Figure 12C:
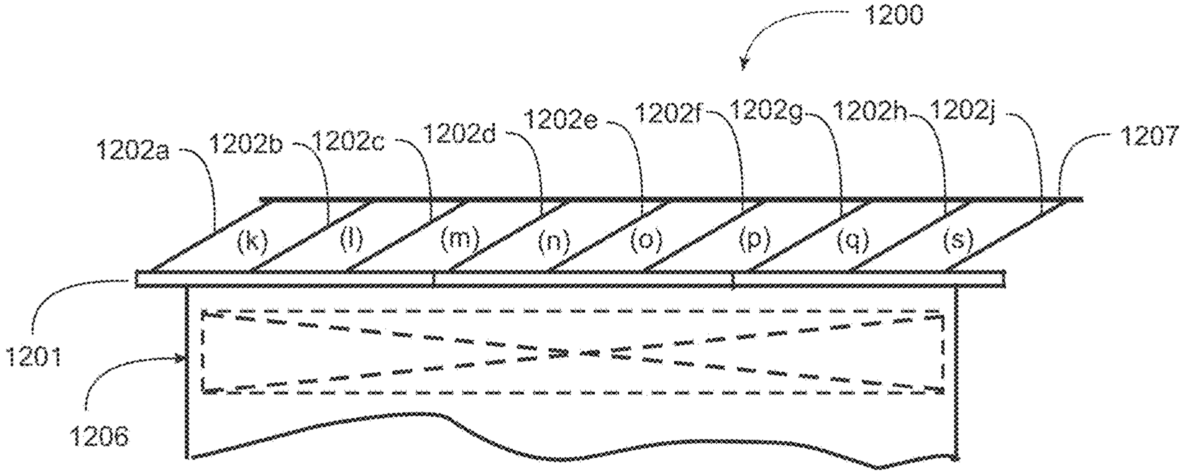
FIG. 12C is a side elevation view of a killing mechanism comprising panels according to FIG. 12B.

FIG. 12C is a side elevation view of a killing mechanism 1200 comprising panels 1201*a* through 1201*j*, each panel having its own plane oriented at about sixty degrees with the plane of flange 1201, with each panel spot welded by the bottom edge 1205 of its frame to flange 1201. A joining member 1207, which may be a metal rod, is welded across the top to each of the top edges of the panels, to hold the matrix of panels in place. In some embodiments more than one member 1207 may be used.

With the bottom edges of each of the panels each welded near ends of the length to flange 1201, and the top edges joined by member 1207 the panels form an assembly 1200 through which air with entrained insects must pass from blower 1206. The air flow is generally upward into assembly 1200, and impinges on the tilted, perforated panels. Insects entrained in the airflow strike the thin, perforated metal sheets 1204, which are placed at a steep angle to the airflow. The diameter of the holes that define the perforation are such that the insects have dimensions in general larger than the diameter of the holes. The insects strike thin edges of the holes and are cut into pieces, with the pieces passing through the holes or upward through the spaces between panels.

In one embodiment additional perforated panels are incorporated into the assembly from all edges of a panel 1202(*n*) and an adjacent panel. Referring again to FIG. 12C it may be seen that there are opening to the sides of assembly 1200 between the adjacent panels. That is, panel 1202*a* is adjacent to panel 1202 *b*, but there is an open area (k) on each end of the adjacent panels. This is important, because the inventor has discovered that a considerable flow of air from blower 1206 is directed out to the sides rather than straight up. This is because the rotary nature of blades in the fan impart a rotary spin to the upward-flowing air, as roughly indicated by spiral arrow 1210 in FIG. 12A (may be opposite rotation). So, air impelled by the blower flows outward as well as upward. Many insects entrained in the airflow may pass outward through the areas between the ends of the panels and escape the cutting edges of the holes in the perforated panels.

So additional perforated thin sheets are welded between adjacent panels on each end, such that the area (k) through(s) on both sides of the assembly are closed by thin perforated sheet material. There is thus no escape for entrained insects to avoid the cutting edges of holes in the perforated panels and sheets closing the end areas.

The skilled person will understand that the panels may vary in width "W:", and in number and spacing across flange 1201, the hole size may vary, the thickness of the thin perforated sheets may be different in different embodiments, and the panels may be connected and supported in different ways. All of this description is exemplary.

In alternative embodiments additional killing mechanisms may be implemented in the path of air flow from the blower, in addition to the mechanism shown at the outlet of the blower plenum, affixed to the flange of the plenum. As described above, in many embodiments the air flow is redirected to horizontal by baffles and structure such as element 302 in FIG. 3, after being initially urged upward by the blower. In one alternative a second killing mechanism apparatus may be positioned just above the first one affixed to the flange of the blower plenum. Additional mechanisms may be implemented downstream in the airflow and may be fastened to inside of the structure that contains and directs the air flow. These additional structures may have different numbers and spacing and orientation of panels, with a commonality that the panels are perforated as described for panels 1202(*n*).

Figure 13A:
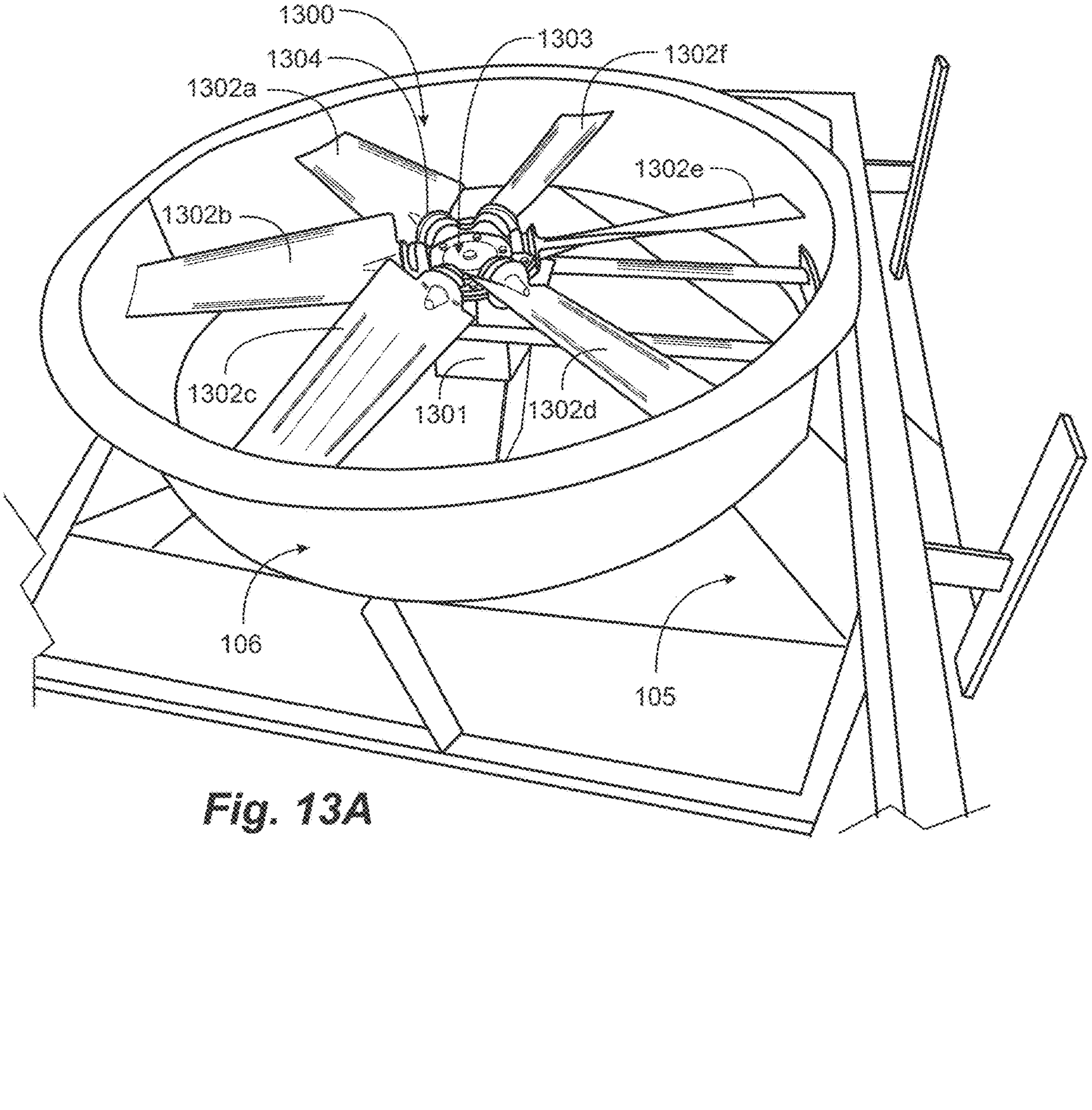
FIG. 13A is a perspective view looking into a plenum at rotor blades of a fan for producing vacuum in an embodiment of the invention.

FIG. 13A is a perspective view of with a viewpoint into fan assembly 106 above plenum 105 of the vacuum machine in one embodiment of the invention having a single fan. In this example a fan 1300 driven by a hydraulic motor 1301 has six fan blades 1302*a* through 1302*f* each joined to a central hub 1303 by a rotary interface 1304. In some other embodiments the motor may be an electric motor. Rotary velocity of the fan may be adjustable.

In this example each fan blade is adjustable in attitude, meaning the angle at which the fan blade meets the air, by manual rotation about the interface 1304. In some embodiments there is a locking mechanism on each interface 1304 that may be loosened and retightened in adjusting attitude of each fan blade. In one embodiment the fan blades may be adjusted in attitude in concert by a motor driven mechanism.

Figure 13B:
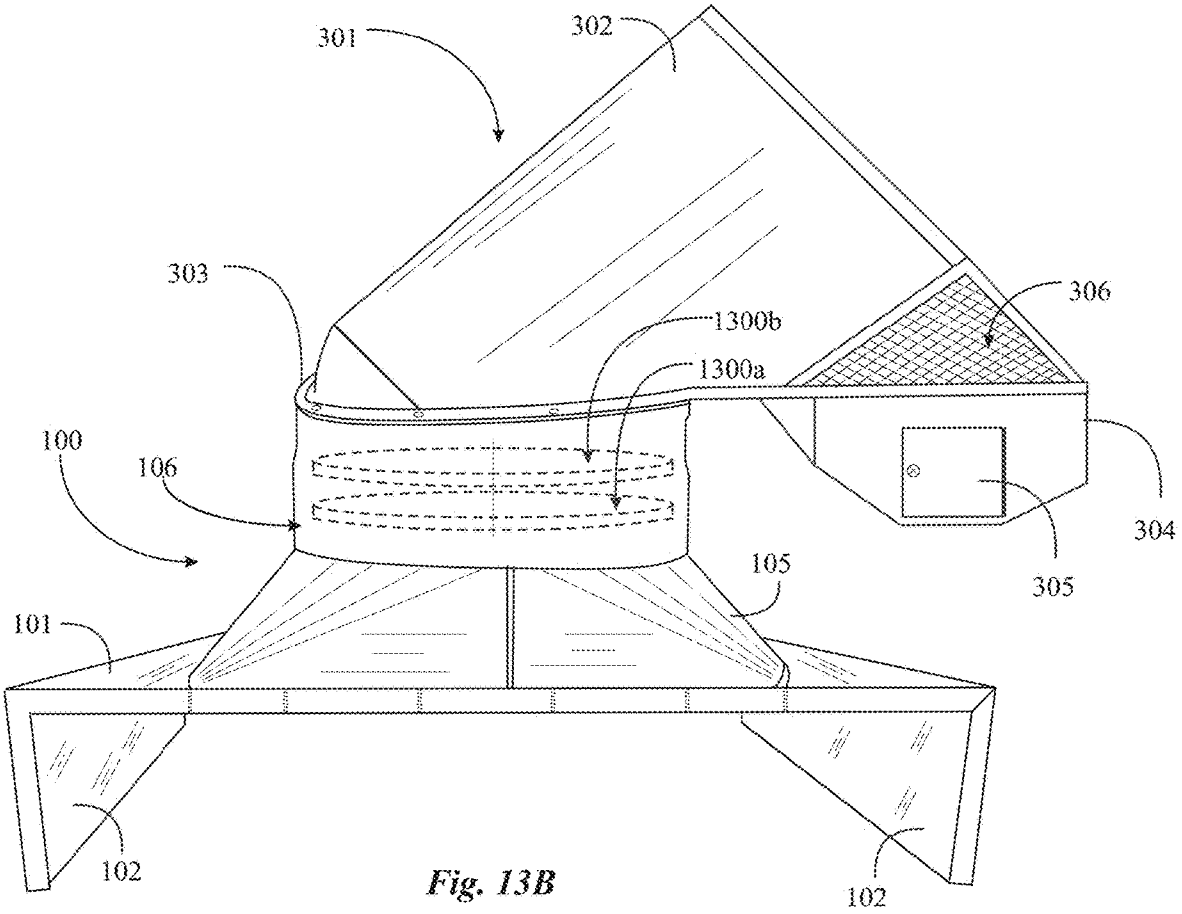
FIG. 13B is an elevation view of a vacuum machine according to an embodiment of the invention having a fan assembly with two fans in an embodiment of the invention.

FIG. 13B is an elevation view of a vacuum machine according to an embodiment of the invention having a fan assembly 106 with two fans 1300*a* and 1300*b* in an embodiment of the invention. In this example the housing for fan assembly 106 may be made longer to accommodate the two fans and attendant elements. The two fans are indicated as dotted outlines within the housing of the fan assembly, and may have motors, blades and other elements as described referring to FIG. 13A above. In this example the baffles inside side walls 102 and the brushes 104 are not used.

In some embodiments of the invention different sorts of fan or blower units may be used instead of the propeller type fan shown in FIG. 13A, including centrifugal blowers of the sort used in furnaces. The vacuum machine in different embodiments is not limited to a particular fan, but may use any one of a variety of air propulsion mechanisms and devices.

Figure 14:
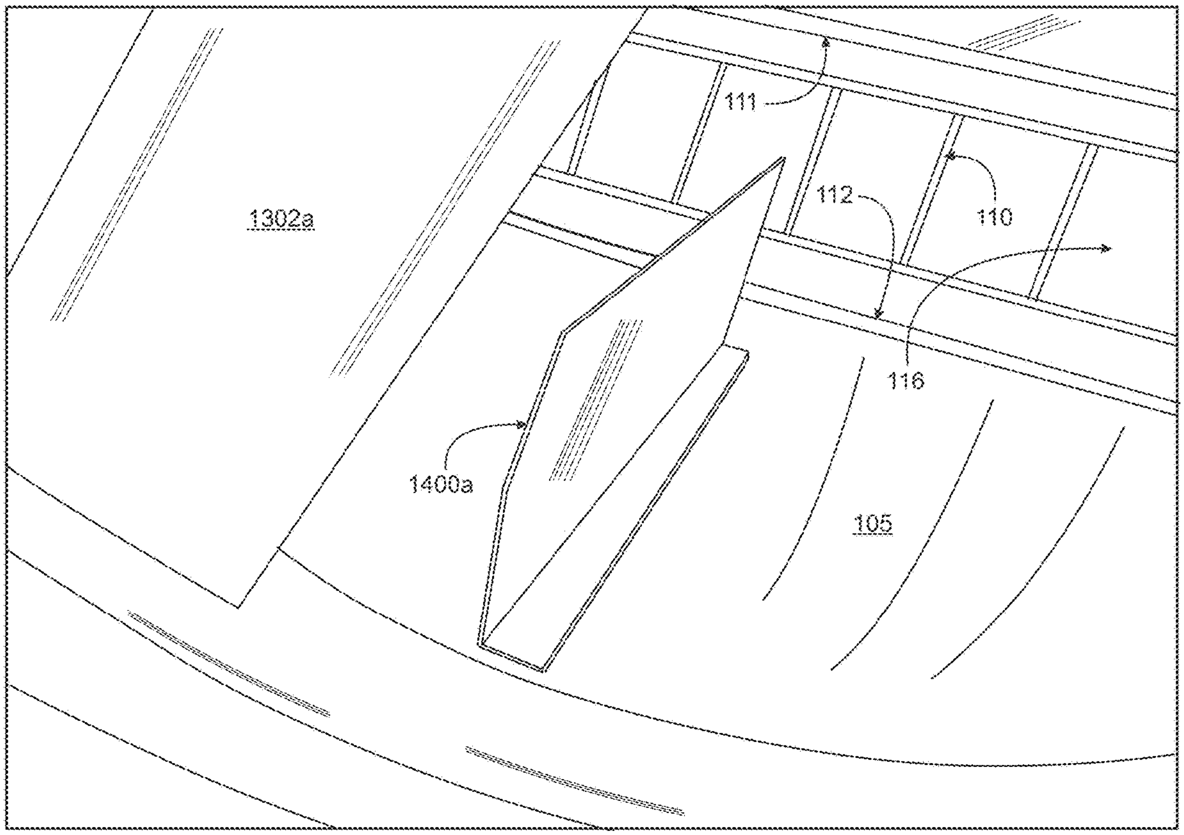
FIG. 14 is a perspective view into plenum 105 beneath the fan or fans.

FIG. 14 is a perspective view into plenum 105 below the fan assembly. One fan blade 1302*a* is seen. Opposite edges 111 and 112 of the rectangular opening through deck 101, through which air and insects are drawn, is illustrated, and the matrix of rods 110 used as a barrier for large debris is illustrated as well (see FIG. 2). One vane 1400*a* is shown welded to an inside wall of plenum 105. There are in a completed vacuum machine, in this example, several vanes such as vane 1400*a*, spaced around the plenum walls, and all directed vertically, as guides for flow of the air drawn into the plenum by the fan or fans. As described above with reference to FIG. 12A the motion of the fan blades imparts a spiral spin to the air drawn upward through plenum 105, and vanes such as vane 1400*a* and others tend to straighten the airflow.

Figure 15:
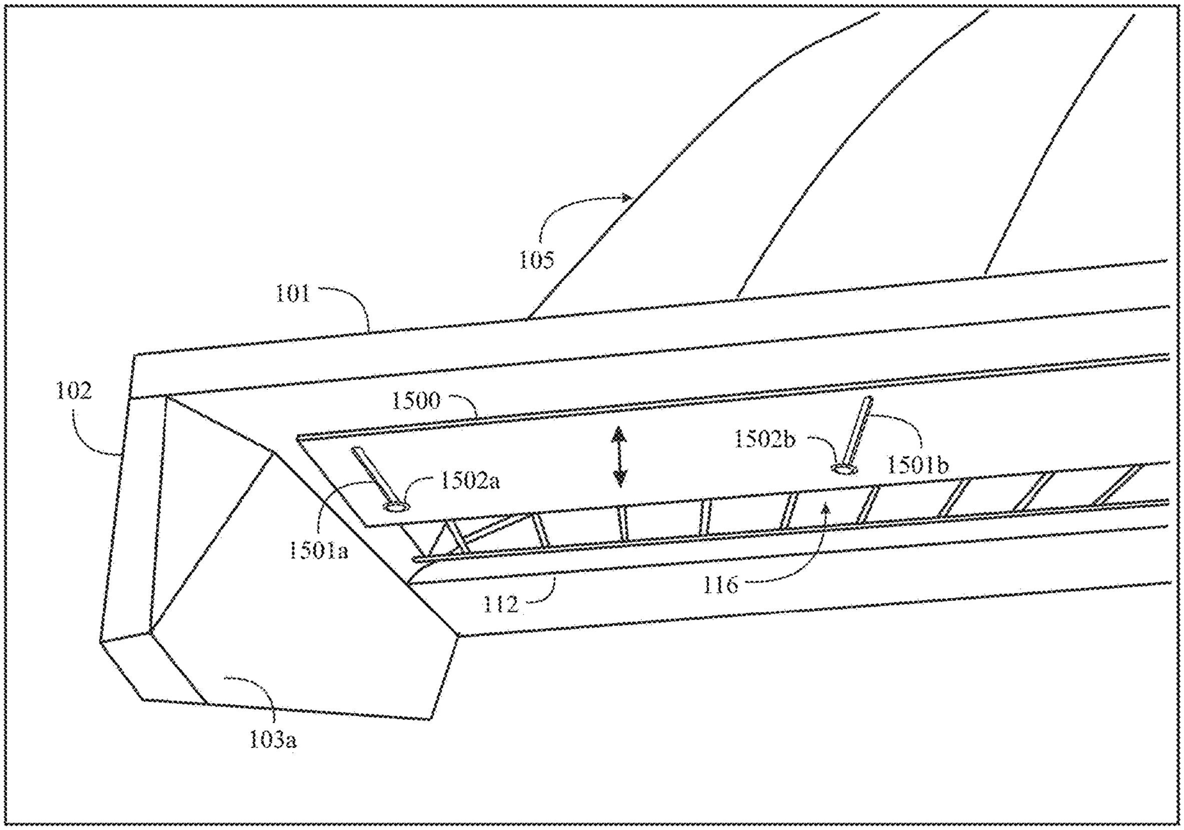
FIG. 15 is a perspective view of the underside of a vacuum machine showing an adjustable closure for the opening through the deck into the plenum.

FIG. 15 is a perspective view of the underside of a vacuum machine in an embodiment of the invention showing an adjustable closure for opening 116 through deck 101 into plenum 105. The closure comprises a substantially rectangular plate 1500, which may be aluminum or stainless steel, or other suitable material. Plate 1500 has two or more slots represented by slots 1501*a* and 1501*b* that extend in a direction across the narrow dimension of opening 116. Plate 1500 is secured to the underside of deck 101 by screw fasteners 1502*a* and 1502*b* in this example. Fasteners 1502*a* and 1502*b* may be loosened to adjust position of plate 1500 below opening 116, and may be positioned to leave opening 116 fully open, fully closed, or at any percentage of closed. After positioning plate 1500 fasteners 1502*a* and 1502*b* may be tightened to secure plate 1500 at a new position.

Referring now back to FIGS. 13A and 13B, it was described that the attitude of the blades of the fan or fans may be adjusted, and there may be more than one fan. The inventor has discovered that application of the vacuum machine in an embodiment of the invention to different crops and different insects often requires adjustment of the suction, and the velocity of air propelled by the fan or fans for best results. Adjustment of the area of opening 116 through the deck and guiding the vertical travel of the air with vanes such as 1400*a* aid in finding the best conditions for each crop and insect combination.

In developing and testing apparatus for catching insects the inventor has discovered that grasshoppers are notoriously difficult to capture by the vacuum machine. Grasshoppers seem to be more athletic than many other species, and quickly hop to one side or the other as the machine approaches and are not captured.

Figure 16:
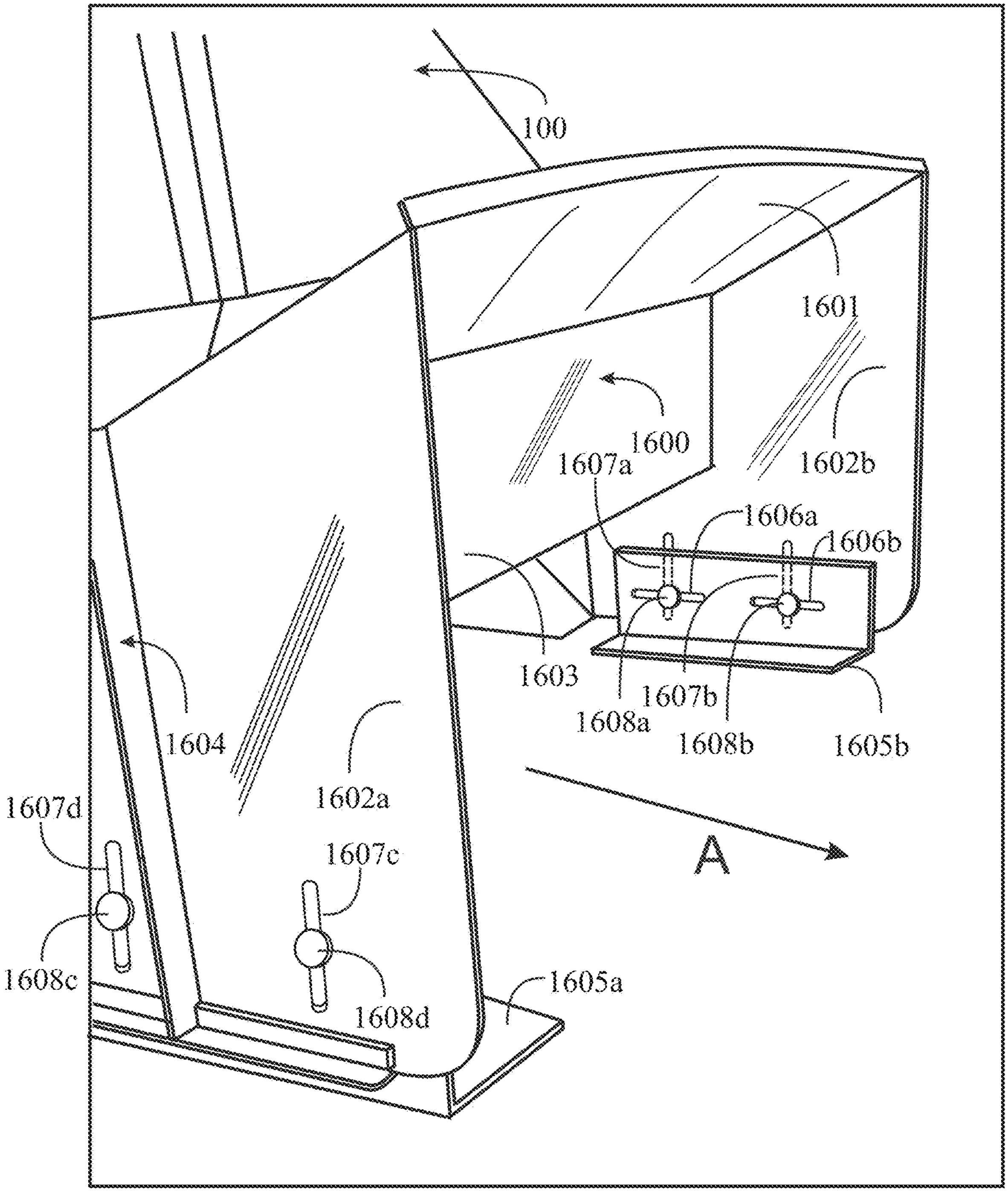
FIG. 16 is a perspective elevation view of a shroud used for corralling insects ahead of a vacuum machine.

FIG. 16 is a perspective elevation view of a shroud 1600 used for corralling grasshoppers and other insects ahead of a vacuum machine according to an embodiment of the invention. Shroud 1600 comprises a curved top panel 1601, a left vertical side panel 1602*a*, a right vertical side panel 1602*b*, and a back panel 1603, all welded together as shown. Shroud 1600 is joined by welding or by fasteners to a frame structure 1604 that is adapted to connect to a front portion of vacuum machine 100 in an embodiment of the invention, to carry the shroud projecting to the front of the machine as the machine progresses over crops in the direction of arrow A. The inventor has discovered that the grasshoppers are constrained by the top and side panels of shroud 1600 as they hop up or to one side to escape. The grasshoppers are then entrained in air drawn into the machine through opening 116.

In one embodiment a first and a second adjustable L-shaped panels 1605*a* and 1605*b* are assembled to side panels 1602*a* and 1602*b* to account for different plant sizes over time. The inventor has discovered that grasshoppers will dive into the furrow area between plant rows as the vacuum machine progresses along a row. The horizontal portion of the L-shaped panels provides a barrier to escape into the furrow area.

Each side panel in this example has a pair of vertical slots, 1607*a* and 1607*b* in side panel 1602*b*, and 1607*c* and 1607*d* in side panel 1602*a*. L-shaped panel 1605*b* has two horizontal slots 1606*a* and 1606*b*. L-shaped panel 1605*b* is fastened to side panel 1602*b* by fasteners 1608*a* and 1608*b* through the slots. L-shaped panel 1605*a* has two horizontal slots not seen and is fastened to side panel 1602*a* by fasteners 1608*c* and 1608*d* through slots 1607*c* and 1607*d*. The fastening through crossing slots enables the L-shaped panels to be raised and lowered, to be extended forward and to the rear, and also enables the L-shaped panels to be angled either upward or downward to horizontal. The several degrees of freedom in positioning the L-shaped panels allows a user to maximize the capturing potential according to crop and plant maturity. The skilled person will understand that the fastening and positioning of the side panels may be accomplished in a variety of ways, and the fastening through slots as shown is just one example.

Figure 17:
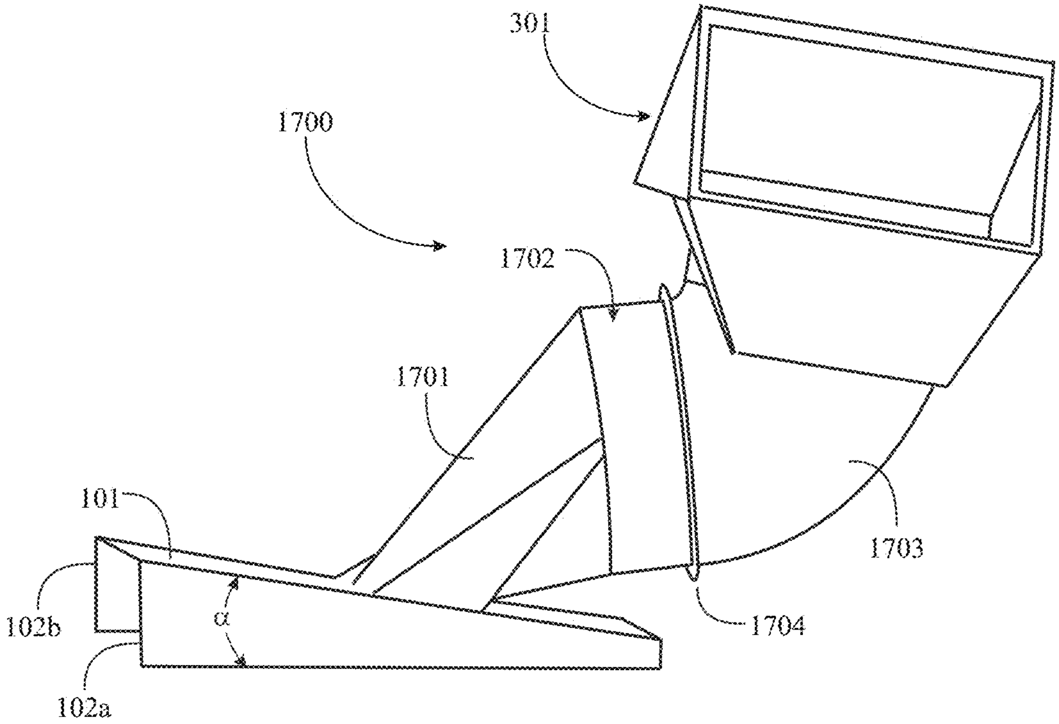
FIG. 17 is a side elevation perspective view of a vacuum machine in yet another embodiment of the invention.

FIG. 17 is an elevation perspective view of another vacuum machine 1700 analogous to machine 100, in an alternative embodiment of the invention. Deck 100 in machine 1700 is inclined at an angle α in this example of about fifteen degrees. Plenum 1701 is analogous to plenum 105 of machine 100 in FIG. 1, and fan assembly 1702 is analogous to fan assembly 106 in FIG. 1. Connector 1703 connects fan assembly 1702 to structure 301, which is essentially the same as structure 301 in FIG. 1, comprising killing and collecting elements. A purpose of the angled structure of machine 1700 is to provide an ability to draw air at an angle relative to the vertical draw of machine 100 of FIG. 1. The inventor has discovered thar some insects are more reliably captured and drawn in with such an angled orientation of the elements of the machine. The skilled person will understand that the angles shown are exemplary, and may be varied in other embodiments.

Figure 18:
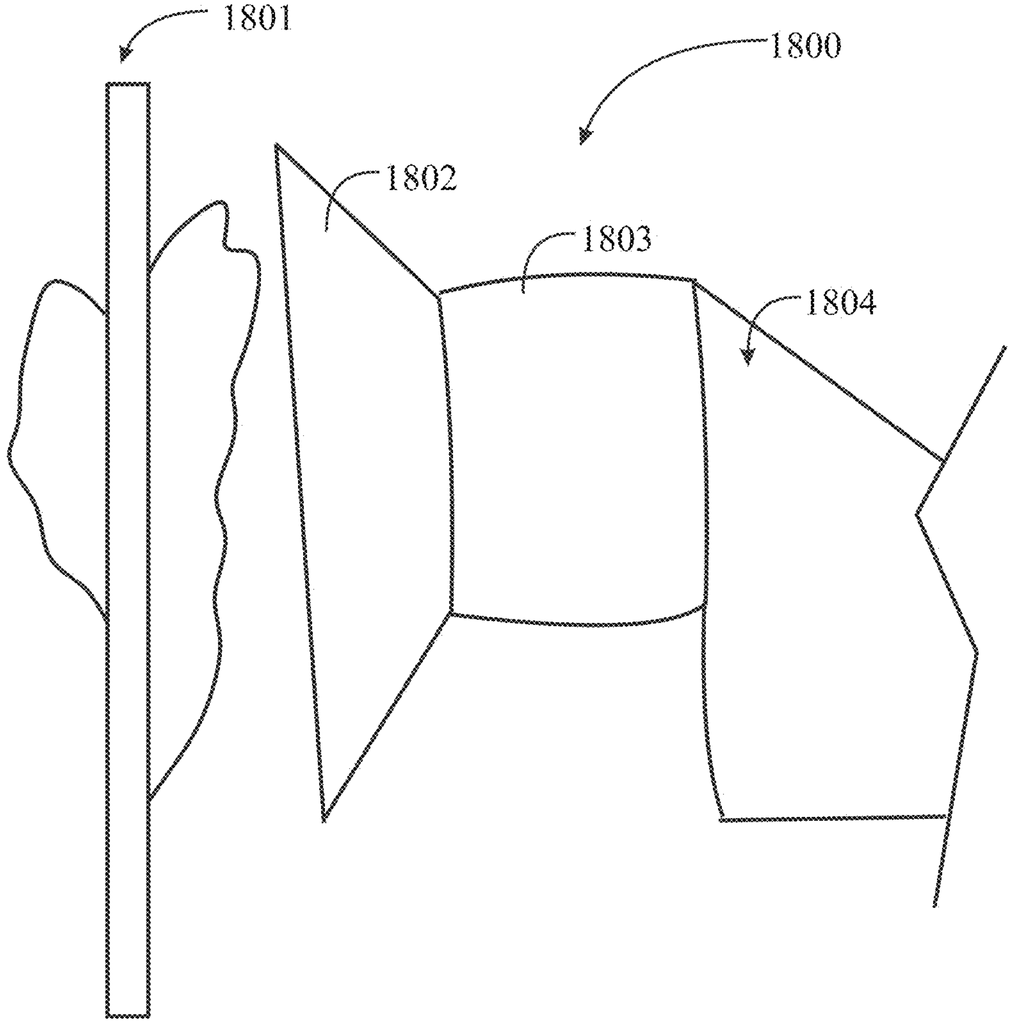
FIG. 18 is a diagrammatic view of a vacuum machine applied to grape vines in an embodiment of the invention.

FIG. 18 is a diagrammatic elevation view of a vacuum machine 1800 applied to grape vines 1801 in an embodiment of the invention. Plenum 1802 is analogous to plenum 105 in FIG. 1. Fan assembly 1803 is analogous to fan assembly 106 of FIG. 1, and structure 1804 is analogous to structure 301 of FIG. 3, comprising killing and collection elements. Machine 1800 may be attached to and carried by a tractor, as is machine 100, but with the collection opening of plenum 1802 positioned substantially vertically and to a side of the direction of travel of the tractor.

Figure 19:
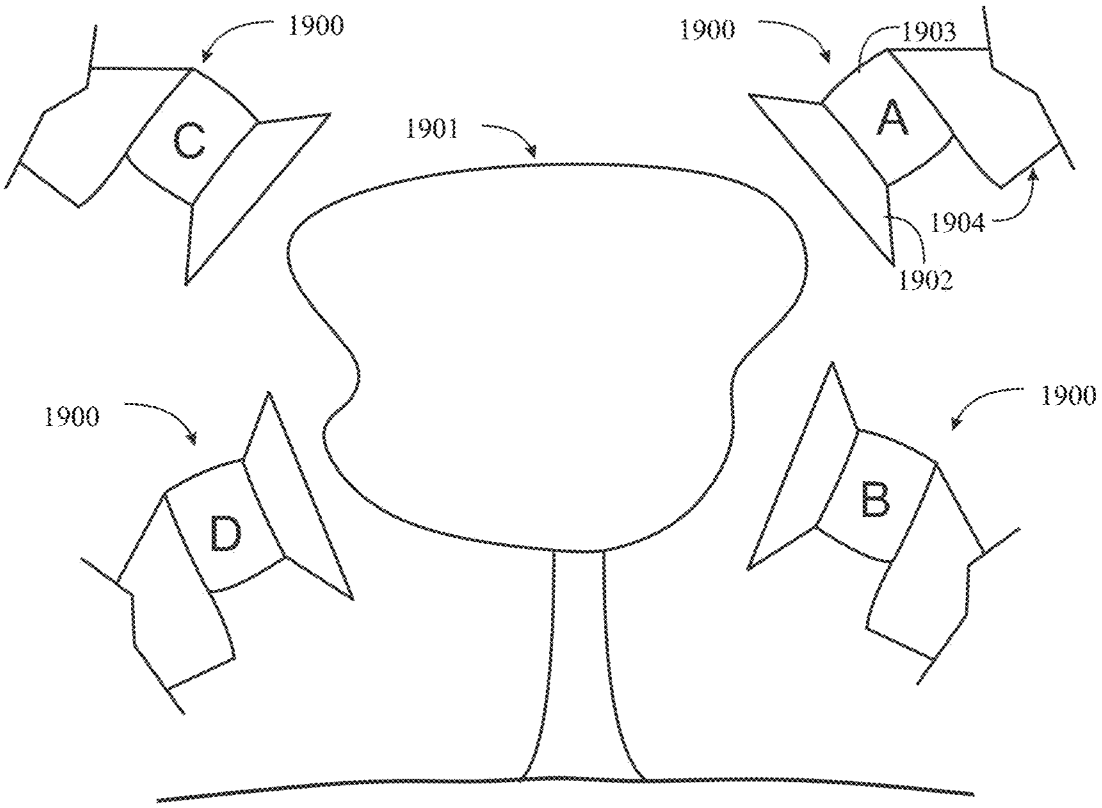
FIG. 19 is a diagrammatic view of a vacuum machine applied to a fruit or nut bearing tree in an embodiment of the invention.

FIG. 19 is a diagrammatic view of a vacuum machine 1900 applied to a fruit bearing tree 1901 in an embodiment of the invention. Four positions A, B, C and D, for machine 1900 relative to tree 1901 are shown. Machine 1900 comprises a collection plenum 1902, analogous to plenum 105, a fan assembly 1903 analogous to fan assembly 106, and a structure 1904, analogous to structure 301. Machine 1900 may be carried by a tractor with an adjustable elevator that can lift and turn machine 1900 in the several different positions to capture insects from tree 1901.

In another embodiment of the invention one or both of ultrasonic transmission and electromagnetic radiation are used ahead of a vacuum machine in its direction or travel or its orientation to disorient and agitate insects as the vacuum machine approaches with a vacuum inlet for capturing insects.

Figure 20:
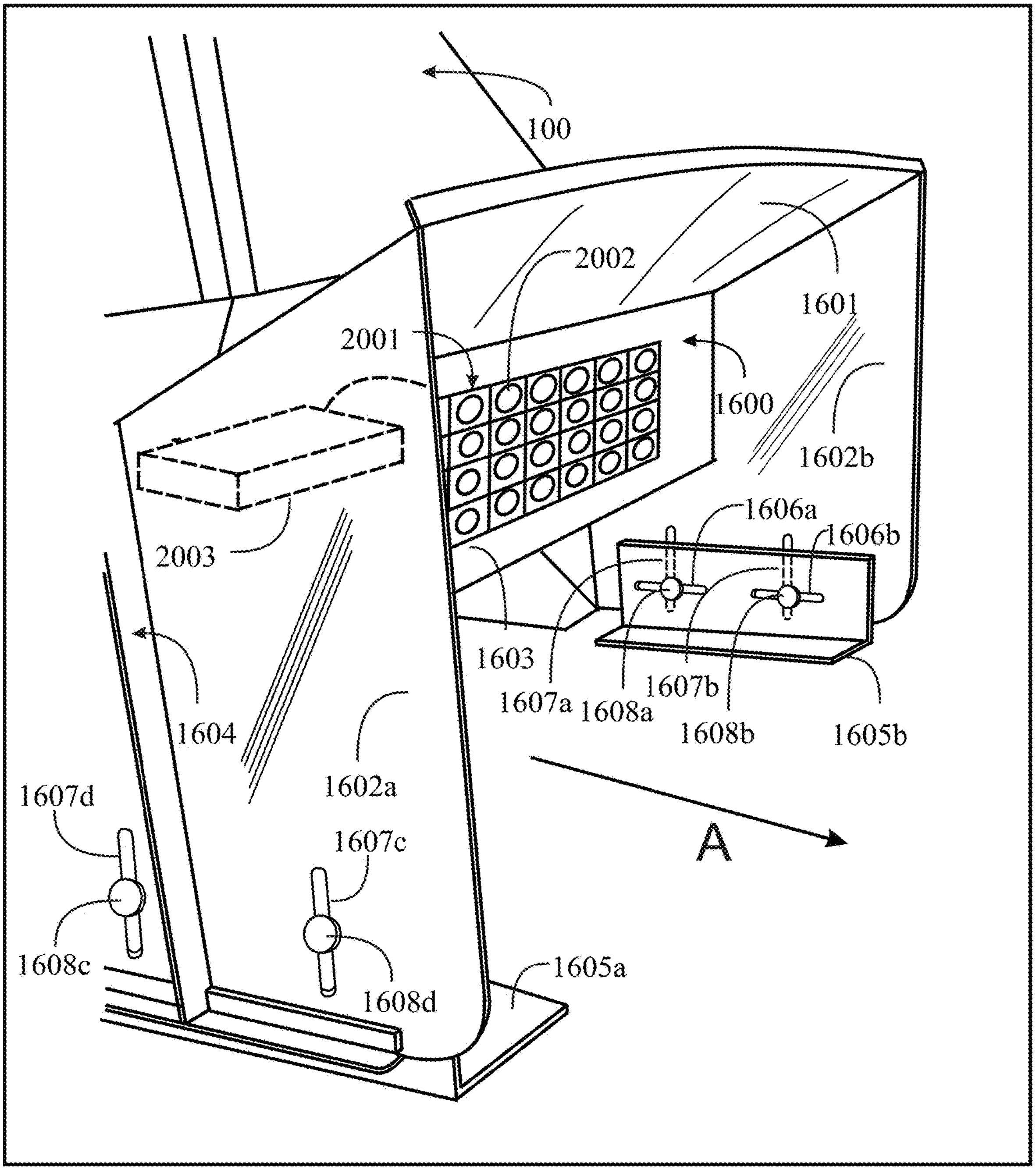
FIG. 20 is a perspective elevation view of a shroud used for corralling insects ahead of a vacuum machine, with ultrasonic agitation.

FIG. 20 is a perspective elevation view of a shroud used for corralling insects ahead of a vacuum machine, with addition of ultrasonic agitation.

Ultrasonic transmitters are generally made up of piezoelectric material driven by varying voltage to generate sound waves which travel through the air until they reach an object. In conventional practice the wave is reflected back and received by an ultrasonic receiver. In the instant embodiment no sensing of reflected sound is accomplished, as the purpose is the effect the ultrasonic transmission has on insects that are the objects that receive the ultrasonic transmission.

Ultrasonic transmitters use piezoelectric crystals to emit sound waves that travel faster than the speed of human hearing. In conventional practice the sound waves bounce off objects, in this application the objects are insects, and return to a receiver, which converts the sound back into an electrical signal. The person with skill in the art will be aware of the nature of ultrasonic transmitters, and many references such as Wikipedia provide ample information about such transmitters, so no detail level description is provided in this application.

In FIG. 20 an array 2001 of ultrasonic transmitters 2002 is provided in a back wall of shroud 1600, the wall oriented with a surface orthogonal to the direction of travel of the vacuum machine noted by arrow A. In this example there are four transmitters 2002 in each vertical column of the array, and the width of the array is not evident as it extends behind a sidewall of the shroud. The exact number of transmitters in the array is not relevant, as the purpose is to provide a plurality of transmitters all transmitting in a common direction to enhance the total transmitted power. There could be just one ultrasonic transmitter, but in most embodiments there will be an array of transmitters.

In embodiments of the invention there is power supply circuitry 2003 coupled to the individual transmitter's oscillating ceramic elements in each transmitter providing ultrasonic waves of sound. The ultrasonic waves impinging on insects in the path of the vacuum machine is believed by the inventor to agitate the insects and dislodge the insects from plants. The skilled person will understand that the number of transmitters and power supplied may be dependent on the size of the vacuum machine, and may be varied as needed.

In some embodiment ultrasonic transmitters may be implemented in a housing element on the front of a vacuum machine without the shroud 1600.

Figure 21:
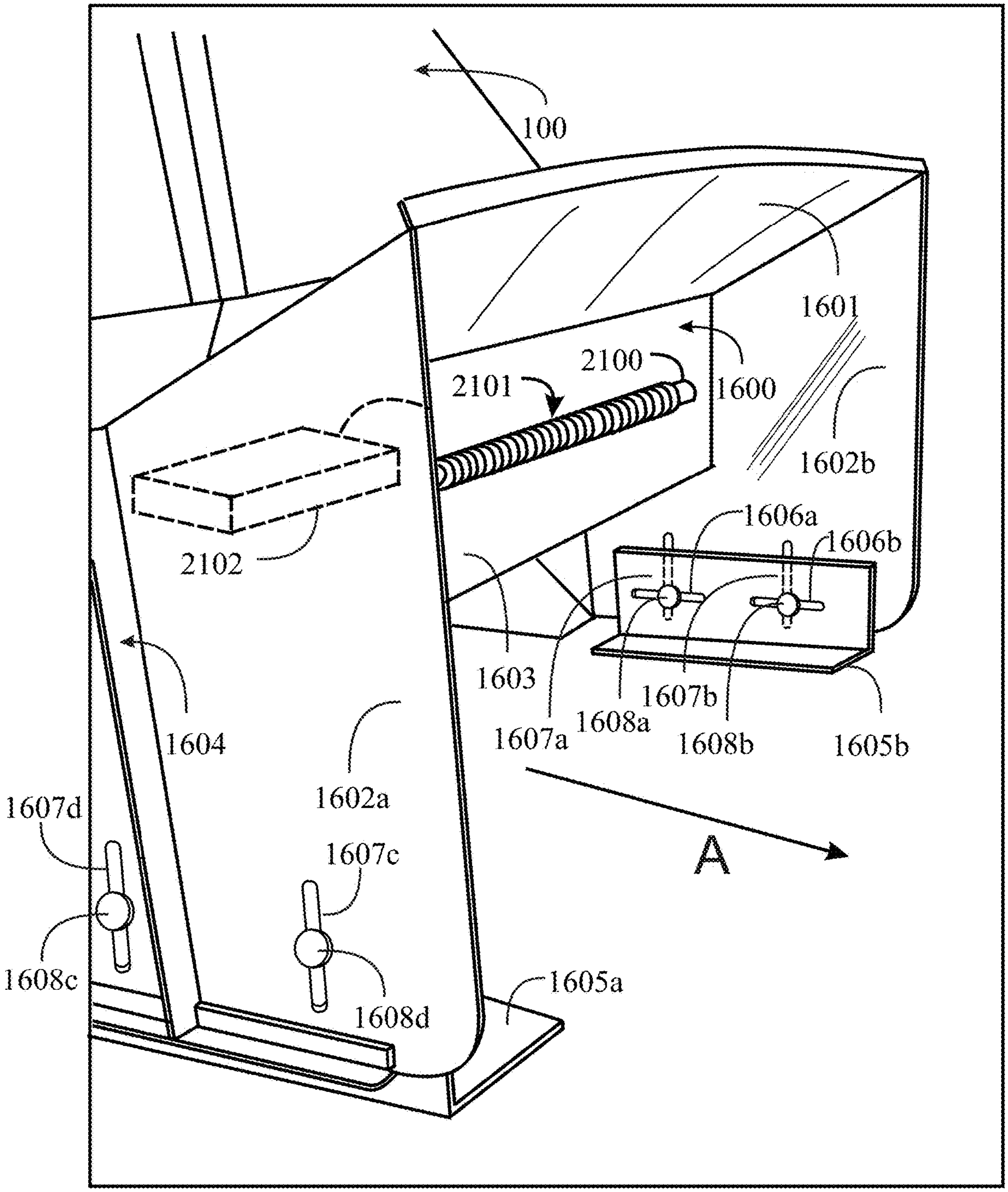
FIG. 21 is a perspective elevation view of a shroud used for corralling insects ahead of a vacuum machine, with magnetic agitation.

FIG. 21 is a perspective elevation view of a shroud used for corralling insects ahead of a vacuum machine, with addition of magnetic agitation. In this example a relatively long iron rod 2100 is positioned either in front of or just behind back panel 1603 and a plurality of windings 2101 of an electrical conductor (wire) are implemented along the length of the rod, providing an electromagnet. A power supply circuit 2102 is provided for inducing a either a DC current or an AC current in the windings, resulting in a magnetic field centered on rod 2100 a portion of which projects forward in the direction of arrow A, which is the direction of travel of the vacuum machine. A portion of the magnetic field also projects downward from rod 2100. The magnetic field impinging on insects in the path of the vacuum machine is believed by the inventor to agitate the insects and to tend to dislodge the insects from plants.

In some embodiment one or more electromagnets may be implemented in a housing element on the front of a vacuum machine without the shroud 1600.

The skilled artisan will understand that the embodiments described herein are exemplary only, and many details may vary in different embodiments within the scope of the invention. In various alternative embodiments, different materials may be used, different blower mechanisms may be used, power may vary, dimensions may vary, and many other details may differ within the scope of the invention.

The invention claimed is:

1. A vacuum machine for capturing insects, comprising:

a substantially flat deck with a front edge, a rear edge, first and second side edges, a length and a width, and having a carrying interface at the rear edge adapted to attach the vacuum machine to a tractor or other vehicle for translation in use;

a first side wall extending downward from the first side edge and a second side wall extending downward from the second side edge;

an opening through the deck with a length in the direction of the width of the deck and a width less than the length of the opening in a direction of the length of the deck;

a first plenum affixed to an upper surface of the deck, the plenum having a lower periphery enclosing the opening through the deck and a height from the lower periphery to an upper circumferential edge of the first plenum;

a fan assembly having a fan housing with an upper and a lower periphery, the fan housing joined by the lower periphery of the fan housing to the upper circumferential edge of the first plenum, the fan assembly having a first internal fan driven by a motor, the fan adapted to draw air upward from the opening through the deck and through the first plenum;

one or more perforated panels in a hood structure joined to the fan housing at the upper periphery of the fan housing, the one or more perforated panels having openings of a size and geometry to destroy insects drawn through the openings;

one or more ultrasonic transmitters positioned in a structural element on a forward portion of the vacuum machine and oriented to transmit in a direction of travel of the vacuum machine; and power circuitry coupled to the one or more ultrasonic transmitters providing electrical power to the one or more ultrasonic transmitters for producing an ultrasonic wave projecting forward in the direction of travel of the vacuum machine.

2. The vacuum machine of claim 1 wherein the structural element on the forward portion of the vacuum machine comprises a back panel of an insect shroud facing forward on a front region of the vacuum machine, and wherein the ultrasonic transmitters are positioned in the back panel of the insect shroud facing forward on the front region of the vacuum machine.

* * * * *